(12) United States Patent
Iida et al.

(10) Patent No.: US 10,606,524 B2
(45) Date of Patent: Mar. 31, 2020

(54) IMAGE FORMING APPARATUS, IMAGE FORMING SYSTEM, INFORMATION PROCESSING APPARATUS, CONTROL METHOD FOR AN INFORMATION PROCESSING APPARATUS, AND NON-TRANSITORY COMPUTER-READABLE STORAGE MEDIUM WITH DETERMINATION OF MOUNTED PUNCH DIE

(71) Applicant: CANON KABUSHIKI KAISHA, Tokyo (JP)

(72) Inventors: Toshihiko Iida, Toride (JP); Yoshiji Kanamoto, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/686,233

(22) Filed: Aug. 25, 2017

(65) Prior Publication Data
US 2018/0067702 A1 Mar. 8, 2018

(30) Foreign Application Priority Data
Sep. 2, 2016 (JP) ................................. 2016-171884

(51) Int. Cl.
*G06F 3/12* (2006.01)
*B65H 37/04* (2006.01)
(Continued)

(52) U.S. Cl.
CPC .............. *G06F 3/1205* (2013.01); *B42C 1/12* (2013.01); *B42C 19/02* (2013.01); *B65H 37/04* (2013.01); *G06F 3/121* (2013.01); *G06F 3/1234* (2013.01); *G06F 3/1236* (2013.01); *G06F 3/1255* (2013.01); *G06F 3/1285* (2013.01); *G06F 3/1286* (2013.01); *G06F 3/1293* (2013.01);
(Continued)

(58) Field of Classification Search
CPC ........ B42C 1/12; B42C 19/02; G06K 15/002; G06K 15/404; G06K 15/408
USPC .................................................. 358/1.1–1.18
See application file for complete search history.

(56) References Cited

U.S. PATENT DOCUMENTS 8,311,473 B2 11/2012 Sasaki et al.
2006/0268317 A1* 11/2006 Lofthus .............. H04N 1/00954
358/1.15
(Continued)

FOREIGN PATENT DOCUMENTS

CN 101000498 A * 7/2007 ............. B21D 28/12

*Primary Examiner* — Gabriel I Garcia
(74) *Attorney, Agent, or Firm* — Venable LLP

(57) ABSTRACT

An image forming apparatus, which is connectable to a first device configured to conduct a punching process on a sheet with use of a replaceable punching member, the first device being connectable to a second device configured to conduct a binding process for generating a bookbinding product having a binding member inserted through a hole punched in the sheet, the image forming apparatus including: a display configured to display a print setting screen; and a controller configured to determine whether or not the replaceable punching member of the first device is compatible with the binding member of the second device, and control the display to inhibit bookbinding setting using the second device from being selected on the print setting screen in a case where the replaceable punching member is not compatible with the binding member.

13 Claims, 15 Drawing Sheets

(51) Int. Cl.
*B42C 1/12* (2006.01)
*B42C 19/02* (2006.01)
*G06K 15/00* (2006.01)

(52) U.S. Cl.
CPC ......... *G06K 15/002* (2013.01); *G06K 15/404* (2013.01); *G06K 15/408* (2013.01); *B65H 2301/4382* (2013.01); *B65H 2402/10* (2013.01); *B65H 2601/324* (2013.01); *B65H 2801/27* (2013.01); *G06F 3/1207* (2013.01)

(56) References Cited

U.S. PATENT DOCUMENTS

| | | | |
|---|---|---|---|
| 2010/0266197 A1* | 10/2010 | Whiting | B42B 5/08 382/152 |
| 2012/0063867 A1 | 3/2012 | Kanamoto | |
| 2016/0080600 A1* | 3/2016 | Nishida | H04N 1/00925 358/1.14 |
| 2016/0255210 A1* | 9/2016 | Tachibana | H04N 1/0032 358/1.15 |

* cited by examiner

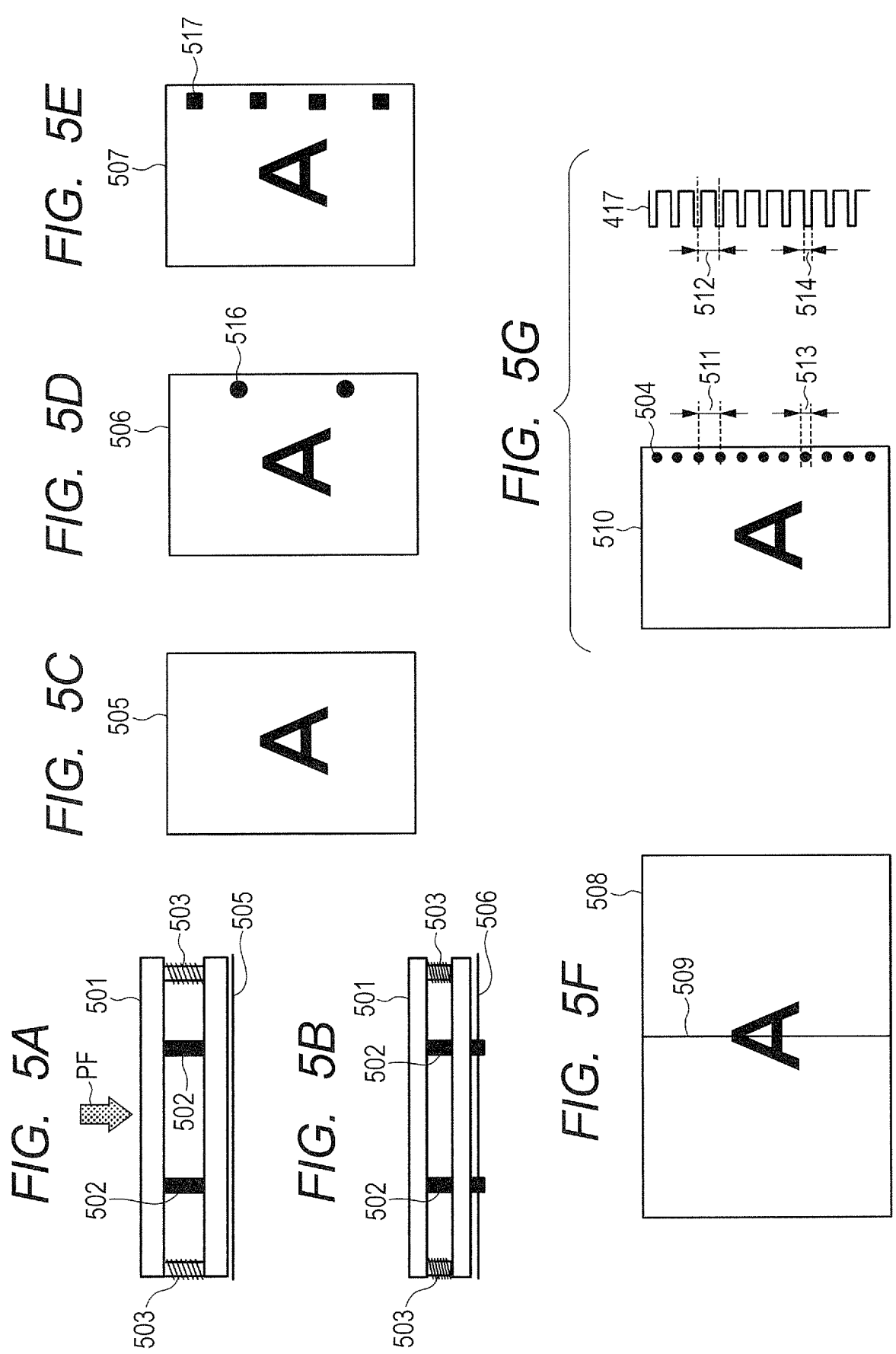

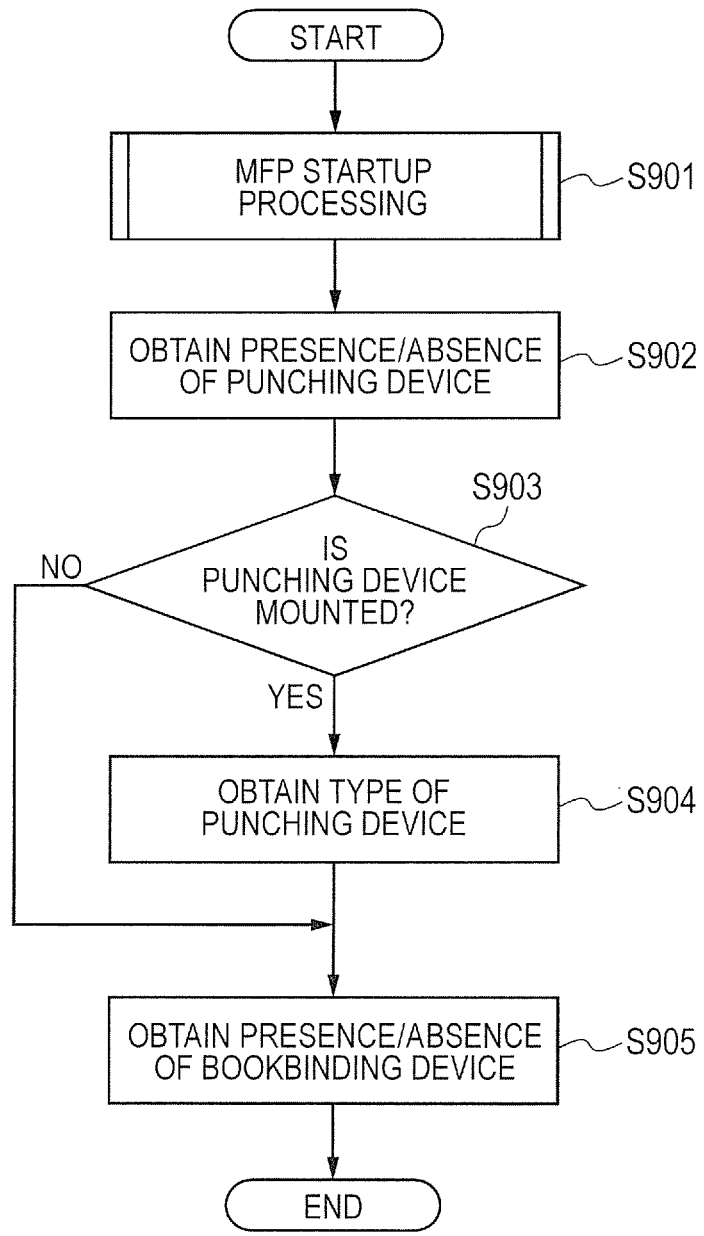

IMAGE FORMING APPARATUS, IMAGE FORMING SYSTEM, INFORMATION PROCESSING APPARATUS, CONTROL METHOD FOR AN INFORMATION PROCESSING APPARATUS, AND NON-TRANSITORY COMPUTER-READABLE STORAGE MEDIUM WITH DETERMINATION OF MOUNTED PUNCH DIE

BACKGROUND OF THE INVENTION

Field of the Invention

The present invention relates to an image forming apparatus, an image forming system, an information processing apparatus, a control method for an information processing apparatus, and a non-transitory computer-readable storage medium.

Description of the Related Art

Hitherto, as one of post-processing functions that can be executed by an image forming apparatus, there is known a bookbinding function for creating a bookbinding printed product by aligning a plurality of sheets of printed paper and subjecting the sheets of printed paper to binding or gluing processing. As an example, there is a saddle bookbinding function of binding a bundle of aligned sheets of paper with staples in its central portion and conducting folding processing along the central portion bound with staples. As another example, there is a case binding function of obtaining a bookbinding printed product by conducting the gluing processing on an end portion of the aligned sheets of paper. As further another example, there is a process for obtaining a bookbinding printed product by conducting a punching process on the end portion of the sheets of paper and inserting a ring-shaped binding member into a spot punched by the punching process, to thereby bind the sheets of paper. The process is called "wire bookbinding function", "ring bookbinding function", or the like after the shape of the binding member used for a binding process.

As an example of a binding method using the ring bookbinding function, there is known a method of obtaining a bookbinding printed product by inserting the binding member, which is formed of plastic or the like and has a predetermined size, into a hole portion in the paper bundle subjected to punching processing. As another example of a binding method using the wire bookbinding function, there is known a wire bookbinding process for inserting a wire serving as a binding member, which is formed of a metal or other such material and cut so as to have an appropriate length, into the hole portion in the paper bundle subjected to punching processing and conducting bending processing on the wire. Those methods are different in the binding member to be used but include the same steps, and are therefore referred to collectively as "wire bookbinding function" in the following description. In order to be distinguished from a binding step using a staple or the like, a binding step described in embodiments of the present invention is referred to as "wire binding".

In the wire bookbinding function, a printing step, a punching processing step, and a binding step are sequentially conducted by separate devices, and hence a step on a downstream side needs to be appropriately controlled so as to suit a step on an upstream side. For example, in U.S. Pat. No. 8,311,473, there is disclosed a method of controlling a punching device by the image forming apparatus so as to inhibit the punching device from conducting the punching processing when the paper to be used has already been subjected to the punching processing.

There is also known a post-processing apparatus configured to deliver the paper to a device on a downstream side without subjecting the paper to the punching process when an appropriate punching tool is not mounted.

As described above, the printing step, the punching processing, and the binding step are sequentially carried out in the wire bookbinding function, and hence the step on a downstream side cannot be carried out when the step on an upstream side cannot be appropriately carried out. The binding step cannot be conducted unless the process for the punching processing is conducted with use of a punching tool (die) having such a shape, the number of holes, and an interval between the holes as to be appropriate for the binding step. Meanwhile, in the punching device, the punching tool can be easily replaced at any time and has a large number of types, which raises a problem in that it is difficult for an operator to constantly grasp whether or not an appropriate punching tool is mounted.

The same problem arises when the wire bookbinding process is executed by an image forming system configured to conduct the wire bookbinding process by connecting separate devices configured to conduct bookbinding, punching, and other such process to the image forming apparatus.

In addition, the same problem arises when an information processing apparatus configured to transmit a print job received from a PC or the like to the image forming apparatus is used.

SUMMARY OF THE INVENTION

The present invention provides an image forming apparatus configured to inhibit bookbinding setting from being selected on a print setting screen when a punching member is not compatible with a binding member.

According to one embodiment of the present invention, there is provided an image forming apparatus, which is connectable to a first device configured to conduct a punching process on a sheet with use of a replaceable punching member, the first device being connectable to a second device configured to conduct a binding process for generating a bookbinding product having a binding member inserted through a hole punched in the sheet, the image forming apparatus comprising:

a display configured to display a print setting screen; and a controller configured to determine whether or not the replaceable punching member of the first device is compatible with the binding member of the second device, and control the display to inhibit bookbinding setting using the second device from being selected on the print setting screen in a case where the replaceable punching member is not compatible with the binding member.

According to another embodiment of the present invention, there is provided an image forming apparatus, which is connectable to a first device configured to conduct a punching process on a sheet with use of a replaceable punching member, the first device being connectable to a second device configured to conduct a binding process for generating a bookbinding product having a binding member inserted through a hole punched in the sheet by the first device, the image forming apparatus comprising:

a receiver configured to receive a predetermined job; and a controller configured to determine whether or not the replaceable punching member of the first device is compatible with the binding member of the second device in a case where the predetermined job received by the receiver includes a designation for conducting the binding process using the binding member, and control the image forming apparatus to inhibit the image forming apparatus from executing the predetermined job in a case where the replaceable punching member is not compatible with the binding member.

Further features of the present invention will become apparent from the following description of exemplary embodiments with reference to the attached drawings.

BRIEF DESCRIPTION OF THE DRAWINGS

FIG. 5A, FIG. 5B, FIG. 5C, FIG. 5D, FIG. 5E, FIG. 5F, and FIG. 5G are diagrams for illustrating processing to be conducted on a sheet.

FIG. 9 is a flowchart for illustrating a control method for an image forming apparatus.

DESCRIPTION OF THE EMBODIMENTS

Now, exemplary embodiments for carrying out the present invention will be described below with reference to the accompanying drawings. The following embodiments are not intended to impose a limitation on the invention according to the appended claims, and every combination of features described in the embodiments is not necessarily mandatory for achieving the invention.

First Embodiment

<Description of System Configuration>

Figure 1:
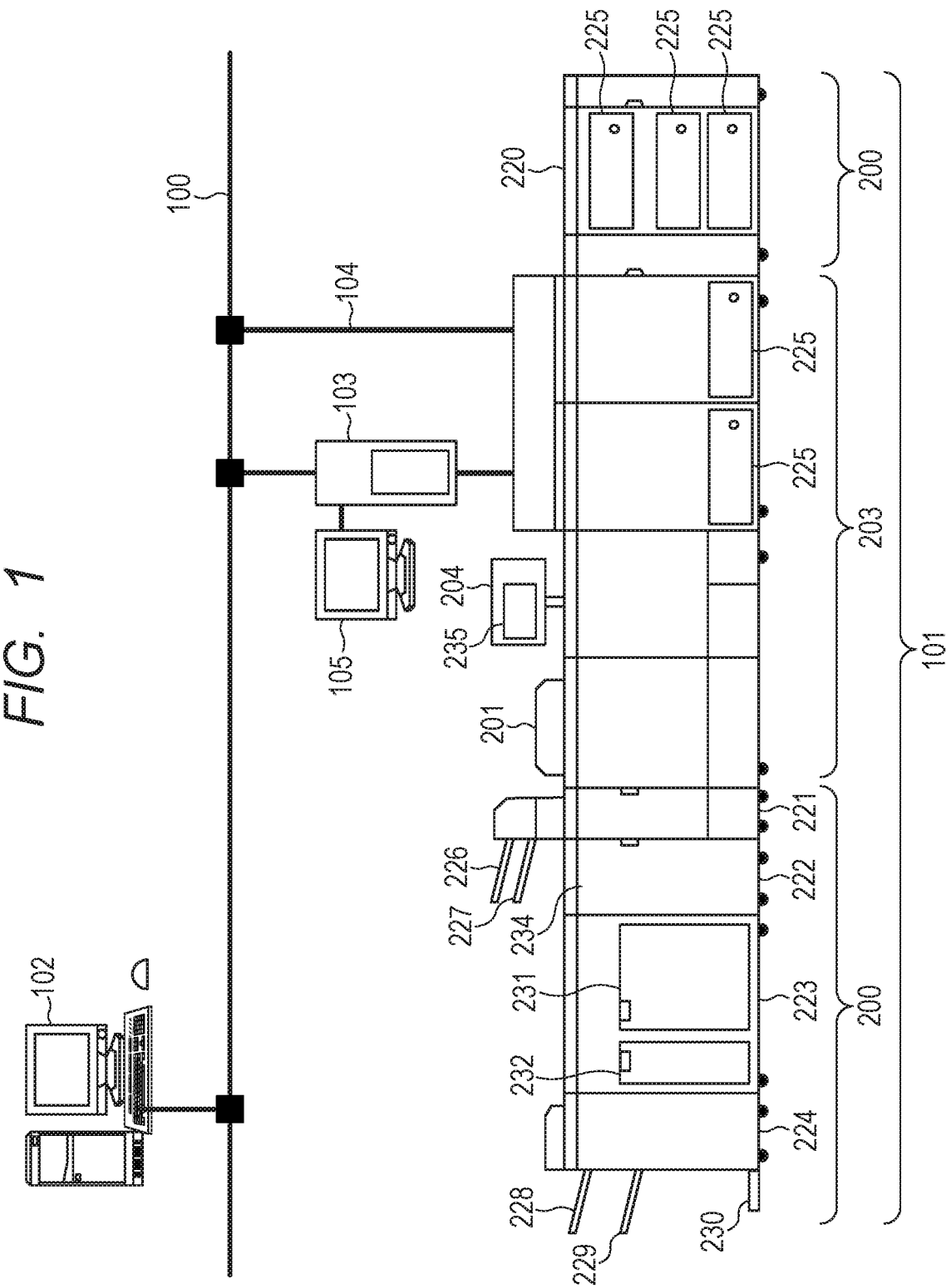
FIG. 1 is a block diagram for illustrating a configuration of a printing system.

FIG. 1 is a configuration diagram for illustrating a configuration of an image forming system including a sheet post-processing apparatus according to a first embodiment. In the first embodiment, a multifunction peripheral (MFP) 101 will be described as an example of an image forming apparatus, and a PC 102 will be described as an example of a host apparatus configured to generate a print job. The MFP 101 and the PC 102 are communicably connected to each other through a network 100. The PC 102 is an information processing apparatus, and is configured to receive a print job from the network 100 and to transmit the print job to the MFP 101. In the example, the image forming apparatus configured as one MFP will be described, but the first embodiment can be configured as a printing system in which separate apparatus communicate to/from each other. In the printing system, a plurality of MFPs 101 and a plurality of host apparatus may be communicably connected to one another through the network 100. The printing system according to the first embodiment is described as including the image forming apparatus and the host apparatus as an example, but the present invention is not limited thereto. For example, the image forming apparatus may be a print processing system. In addition, the apparatus connected to the network 100 may be omitted in execution of a copy job or other such image forming processing that can be executed by a single MFP 101. In the following description, the print job is assumed to include the copy job as well.

First, the PC 102 will be described. The PC 102 can execute different kinds of programs, for example, an application program for submitting a print job. A printer driver having a function of converting print data into a printer language compatible with the MFP 101 is installed in the PC 102. A user who desires to perform printing can issue a print instruction from each of different kinds of applications or the like. The printer driver can convert data to be output by the application based on the print instruction into the print data that can be interpreted by the MFP 101, and transmit the print data to the MFP 101 connected to the network 100.

In the first embodiment, the host apparatus is exemplified by a PC, but may be, for example, a smartphone, a tablet terminal, or other such portable information terminal. A method of transmitting the print data to the image forming apparatus can appropriately be modified. The print data may be transmitted to the image forming apparatus via an application or a driver for printing, or may be transmitted to the image forming apparatus via a cloud server.

Next, the MFP 101 being the image forming apparatus will be described.

The MFP 101 has a reading function of reading an image of an original and a print function of printing the image on a sheet. The MFP 101 also has a post-processing function of binding a plurality of sheets on each of which an image has been printed, aligning the plurality of sheets, and sorting delivery destinations of the plurality of sheets into a plurality of trays. The sheets include plain paper, thick paper, and other such paper and films.

In the first embodiment, the MFP 101 will be described as an example of the image forming apparatus, but the image forming apparatus may be, for example, a printer that does not have the reading function. In the first embodiment, as an example, the image forming apparatus is assumed to include different kinds of components described below.

There may be provided an MFP including an apparatus 103 having part of functions included in the MFP 101 and other auxiliary functions. In this case, from the viewpoint of the PC 102, the apparatus 103 can be regarded as providing the functions of the MFP 101 through the network 100. The apparatus 103 can be accompanied by different kinds of input/output devices, for example, a monitor 105, which are the same input/output devices included in the PC 102. Even when the apparatus 103 is mounted in such an auxiliary manner, the MFP 101 may be configured so as to be connectable directly to the network 100 with use of a network cable 104.

Each of sections forming the MFP 101 will be described below.

A printer portion 203 is configured to form (print) an image on a sheet fed from a sheet feeding portion with use of a toner based on the image data. A configuration and an operation principle of the printer portion 203 are as follows. A light beam, for example, laser light, which has been modulated based on the image data, is reflected by a rotary polygon mirror and applied to a photosensitive drum as scanning light. An electrostatic latent image formed on the photosensitive drum by the laser light is developed with toner, and a toner image obtained in this manner is transferred onto the sheet stuck on a transferring drum. A series of image forming processes are sequentially executed for toners of yellow (Y), magenta (M), cyan (C), and black (K) to thereby form a full-color image on the sheet. In addition to those four colors, a toner called "spot color", a transparent toner, or the like may be allowed to be transferred. The sheet on the transferring drum, on which the full-color image has been formed in this manner, is conveyed to a fixing device. The fixing device includes a roller and a belt, and also includes a built-in heat source, for example, a halogen heater, inside the roller. The fixing device is configured to apply heat and pressure to the toner on the sheet, onto which the toner image has been transferred, to melt and fix the toner to the sheet.

The printer portion 203 of the MFP 101 of the first embodiment is connected to a scanner 201 being an image reading apparatus and an operating portion 204 arranged on an upper surface of the printer portion 203. The operating portion 204 provides different kinds of interfaces used when the user performs different kinds of setting, operations, and the like on the printer portion 203 of the first embodiment. The MFP 101 is also configured so that different kinds of auxiliary devices can be mounted thereto in addition to the printer portion 203.

A large-capacity sheet feeding apparatus 220 is a sheet feeding apparatus that is removably mounted to the printer portion 203. The sheet feeding apparatus includes a plurality of sheet feeding portions 225. With such a configuration, the printer portion 203 can conduct a print process on a large volume of sheets.

An inserter 221 is connectable to the printer portion 203. The inserter 221 is configured to supply an inset (sheet that does not involve image formation or sheet having an image formed thereon separately) to a bundle of sheets each having an image formed thereon by the printer portion 203, so as to obtain a printed product into which the inset is inserted. As illustrated in FIG. 1, the inserter 221 includes two trays 226 and 227.

A punching device 222 is connectable to the printer portion 203 or the inserter 221. The printer portion 203 is connectable to the punching device 222 through the inserter 221 or without the intermediation of the inserter 221. The punching device 222 is configured to conduct punching processing or other such processing on the sheet fed by the printer portion 203 or the inserter 221. The punching device 222 of the example is formed so that a punching tool 501 (described as a die) for punching a hole is replaceable. Therefore, the punching device 222 includes a door 234 for changing the die. The punching device 222 will be described later in detail.

A bookbinding device 223 is connectable to the punching device 222. The bookbinding device 223 is provided in order to carry out a bookbinding process being a feature of the first embodiment. Specifically, the bookbinding device 223 is configured to cause a binding member to pass through a hole portion in the sheet subjected to the punching processing by the punching device 222, and to deform the binding member, to thereby obtain the sheet bundle, that is, a bookbinding printed product.

The created bookbinding printed product is stacked on a tray arranged in the inside to be accessed through a bookbinding door 231. The bookbinding device 223 further includes a door 232 configured to be able to be opened and closed when the binding member is replenished. In addition, the bookbinding device 223 includes a door 233 used to access a sheet conveyance path inside the bookbinding device 223 when, for example, a jam has occurred inside the bookbinding device 223. The bookbinding device 223 will be described later in detail.

A processing device 224 is provided in order to conduct staple-binding processing on a plurality of sheet bundles. Possible types of staple-binding include corner binding, two-position binding, saddle bookbinding stitching, and other such binding process having a format desired by an operator. The processing device 224 is configured to deliver the printed product subjected to the binding process to trays 228 and 229 in a case of the corner binding or the two-position binding and to deliver the printed product to a tray 230 in a case of the saddle bookbinding stitching.

The MFP 101 can be classified into three sections when the printer portion 203 is regarded as a boundary. In FIG. 1, the device arranged on the right side of the printer portion 203 is referred to as "sheet feeding system apparatus", and the sheet feeding system apparatus has a main role of continuously feeding the sheets loaded in the inside to the printer portion 203 at appropriate timings.

The above-mentioned device is also configured to detect a remaining amount of the sheets loaded in the inside. The sheet feeding portion 225 also exists inside the printer portion 203, and can execute the same function as that of the sheet feeding system apparatus. The sheet feeding portion provided to the printer portion 203 is also referred to as "sheet feeding system apparatus" in the following description.

Meanwhile, in FIG. 1, the devices arranged on the left side of the printer portion 203 are referred to collectively as "sheet post-processing apparatus". The sheet post-processing apparatus is configured to conduct different kinds of post-processes and a stacking process on the sheet that has completed the print process. The sheet feeding system apparatus described above and the sheet post-processing apparatus are referred to collectively as "sheet processing apparatus 200" in the following description.

<Description of Image Forming Apparatus>

Figure 2:
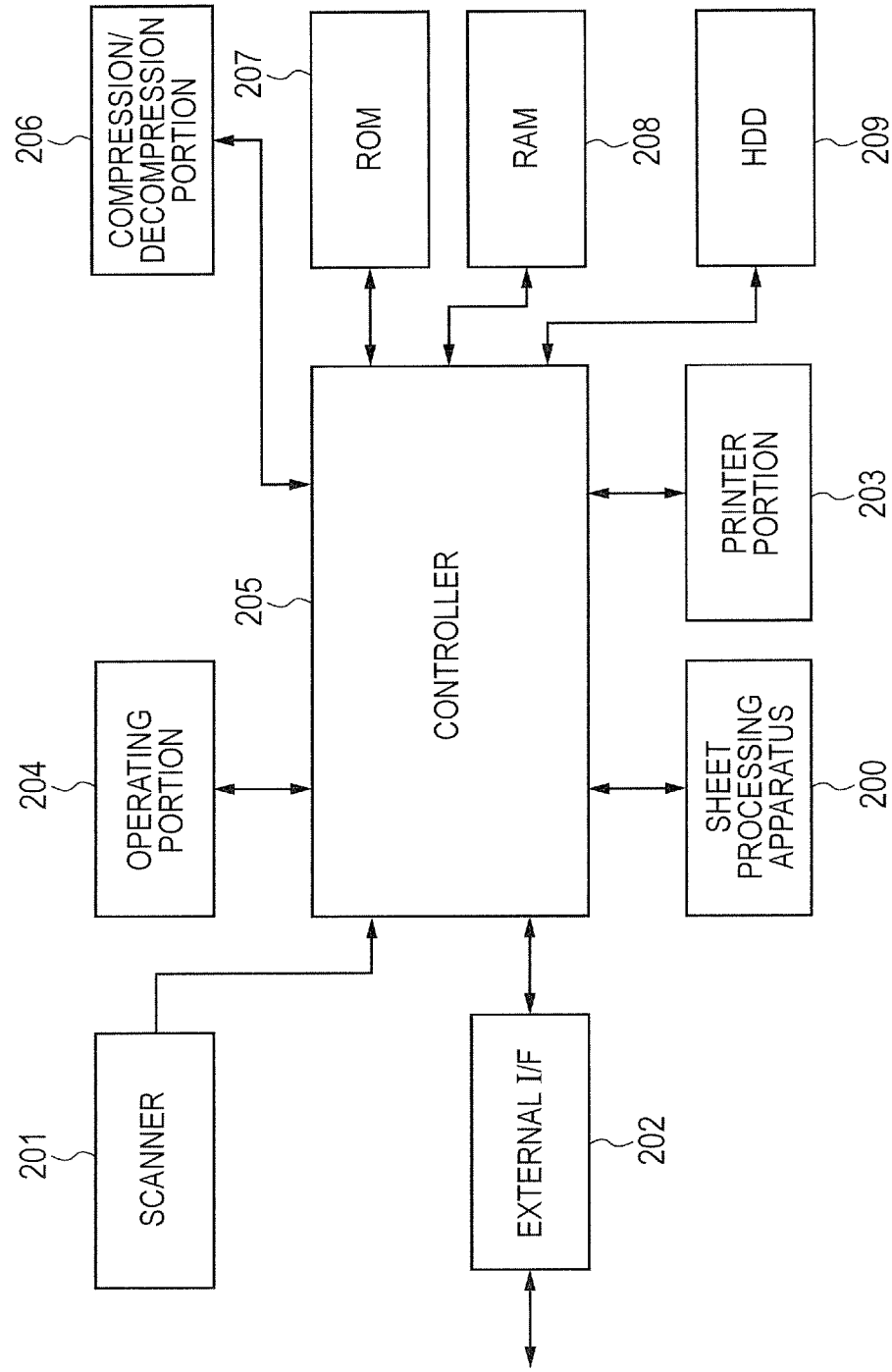
FIG. 2 is a block diagram for illustrating a configuration of software of a multifunction peripheral (MFP).

FIG. 2 is a block diagram for illustrating a configuration of the MFP 101 of FIG. 1. In FIG. 2, the configuration is divided into units in terms of a system, and hence the units do not necessarily correspond to the device components illustrated in FIG. 1.

In FIG. 2, the MFP 101 includes a hard disk drive (hereinafter referred to as "HDD") 209 or other such non-volatile memory configured to store data on a plurality of jobs to be processed inside the own apparatus. In the first embodiment, the MFP 101 using a hard disk drive is described as an example, but the memory is not limited to the hard disk drive as long as the memory is a similar non-volatile storage device having a large capacity.

The MFP 101 has a copy function of storing data received from the scanner 201 in the HDD 209, reading the data from the HDD 209, and conducting printing by the printer portion 203. The MFP 101 also has a print function of storing job data received from an external apparatus through an external I/F 202, which exemplifies a communication portion, in the HDD 209, reading the job data from the HDD 209, and conducting printing by the printer portion 203. The MFP 101 is a multifunction processing apparatus (MFP) (hereinafter also referred to as "image forming apparatus") having such a plurality of functions. The MFP 101 may perform either color printing or monochrome printing. The scanner 201 is configured to read an original image, to conduct image processing on the image data obtained by reading the original, and to output the image data.

The external I/F 202 is configured to transmit and receive the image data or the like to/from a facsimile machine, a network-connected device, or an external dedicated apparatus. The HDD 209 also stores different kinds of management information or the like which are permanently stored, changed, and managed by the MFP 101. The MFP 101 also includes the printer portion 203 configured to execute the print process for the job data to be printed which is stored in the HDD 209. The MFP 101 also includes the operating portion 204 including a display 235, which corresponds to an example of a user interface portion.

A controller 205 corresponding to an example of a controller included in the MFP 101 includes a CPU (not shown), and is configured to centrally control processing and operations of different kinds of units included in the MFP 101. The ROM 207 includes programs for executing different kinds of processing or the like of flowcharts described later to be executed by the controller 205. The ROM 207 stores different kinds of control programs required in the first embodiment. The ROM 207 also stores a display control program for displaying different kinds of user interface screens (hereinafter referred to as "UI screens") on the display 235 of the operating portion 204, which includes the UI screens.

The CPU of the controller 205 reads and executes the programs stored in the ROM 207, to thereby cause the MFP 101 to execute different kinds of operations of the first embodiment. The ROM 207 also stores a program for causing the controller 205 to execute an operation for interpreting page description language (hereinafter referred to as "PDL") data received from the external apparatus through the external I/F 202 and decompressing the PDL data into raster image data (bitmap image data).

In the same manner, the ROM 207 stores a program for causing the controller 205 serving as a reception unit to interpret and process the print job received from the external apparatus through the external I/F 202. Those are processed in a software manner.

The ROM 207 is a memory that allows only reading, and stores in advance different kinds of programs including programs for a boot sequence, font information, and the like and the above-mentioned programs. The different kinds of programs stored in the ROM 207 will be described later in detail. A RAM 208 is a memory that enables reading and writing, and stores image data transmitted from the scanner 201 and the external I/F 202, the different kinds of programs, setting information, and the like.

In addition, the HDD 209 stores the image data compressed by a compression/decompression portion 206. The HDD 209 is configured to be able to hold a plurality of pieces of data including print data on the job to be processed. The controller 205 stores the data on the job to be processed, which is input through each of different kinds of input units including the scanner 201 and the external I/F 202, in the HDD 209, reads the data from the HDD 209, outputs the data to the printer portion 203, and conducts the printing.

The controller 205 also conducts such control that the job data read from the HDD 209 can be transmitted to the external apparatus through the external I/F 202. In this manner, the controller 205 executes different kinds of output processing on the data on the job to be processed, which is stored in the HDD 209. The compression/decompression portion 206 uses different kinds of compression methods including JBIG and JPEG to compress or decompress the image data or the like stored in the RAM 208 or the HDD 209. The controller 205 also controls the operation of the sheet processing apparatus 200. The sheet processing apparatus 200 corresponds to the sheet feeding system apparatus and the sheet post-processing apparatus described with reference to FIG. 1.

<Description of Information Processing Apparatus>

Figure 3:
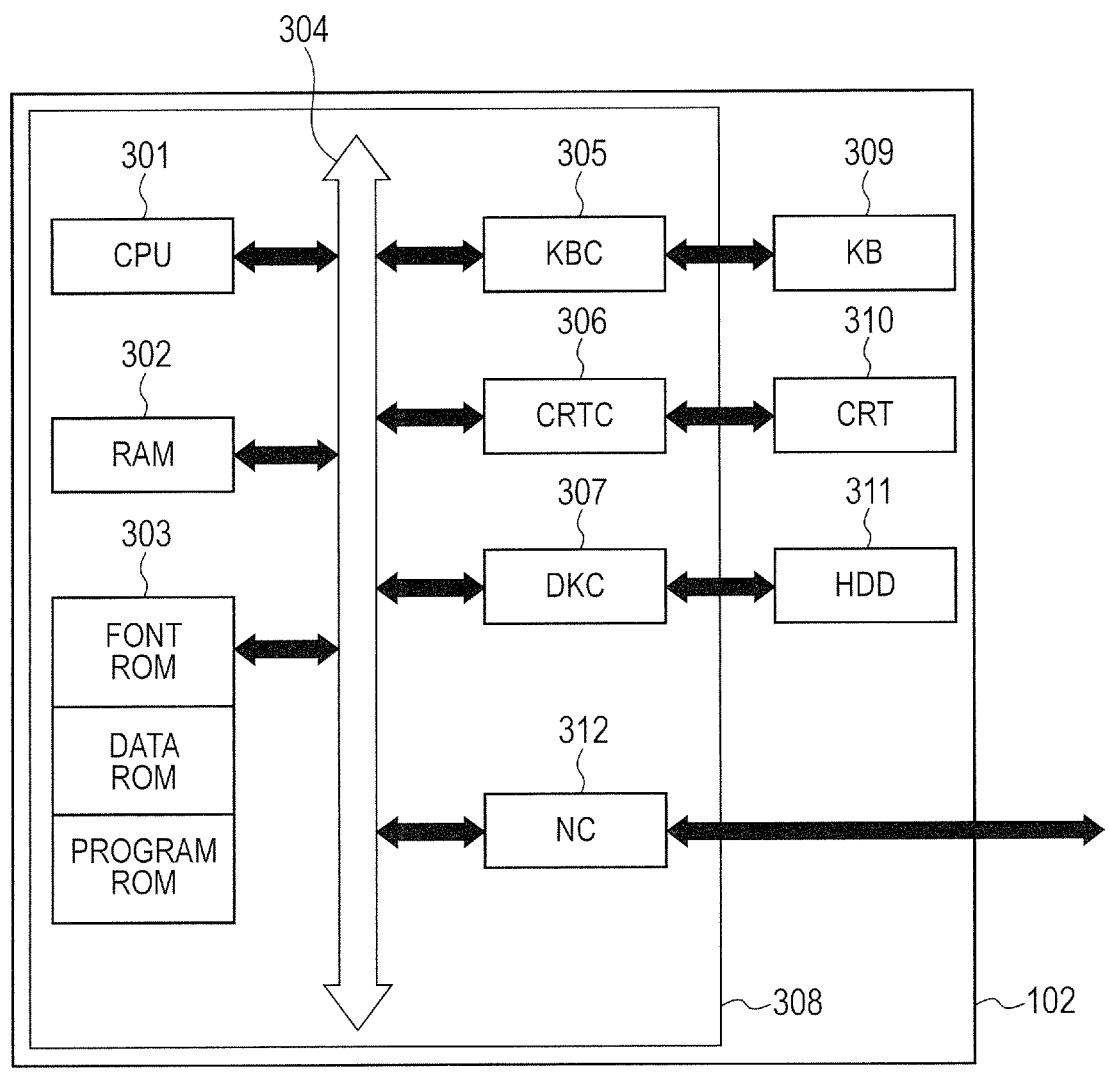
FIG. 3 is a block diagram for illustrating a configuration of a computer (PC).

FIG. 3 is a block diagram for illustrating a configuration of the computer (PC) 102 illustrated in FIG. 1. Now, a configuration of the host apparatus of the first embodiment will be described below.

In FIG. 3, a CPU 301 executes an OS, a general application, bookbinding application, or other such program stored in a ROM for programs within a ROM 303 or loaded from a HDD 311 onto a RAM 302. The ROM 303 also includes a font ROM and a data ROM. The RAM 302 functions as a main memory, a work area, or the like for the CPU 301.

A keyboard controller (KBC) 305 is configured to control input received from a keyboard (KB) 309 or a pointing device (not shown). A display controller (CRTC) 306 is configured to control display on a display (CRT) 310.

A disk controller (DKC) 307 is configured to control access to, for example, the HDD 311 storing a boot program, various applications, font data, a user file, and the like. A network controller (NC) 312 is connected to the network 100, and is configured to execute communication control processing for communications to/from another device connected to the network 100. A bus 304 is configured to connect the CPU 301, the RAM 302, the ROM 303, different kinds of controllers, and the like to one another, and to carry a data signal and a control signal.

<Description of Bookbinding Device>

Figure 4:
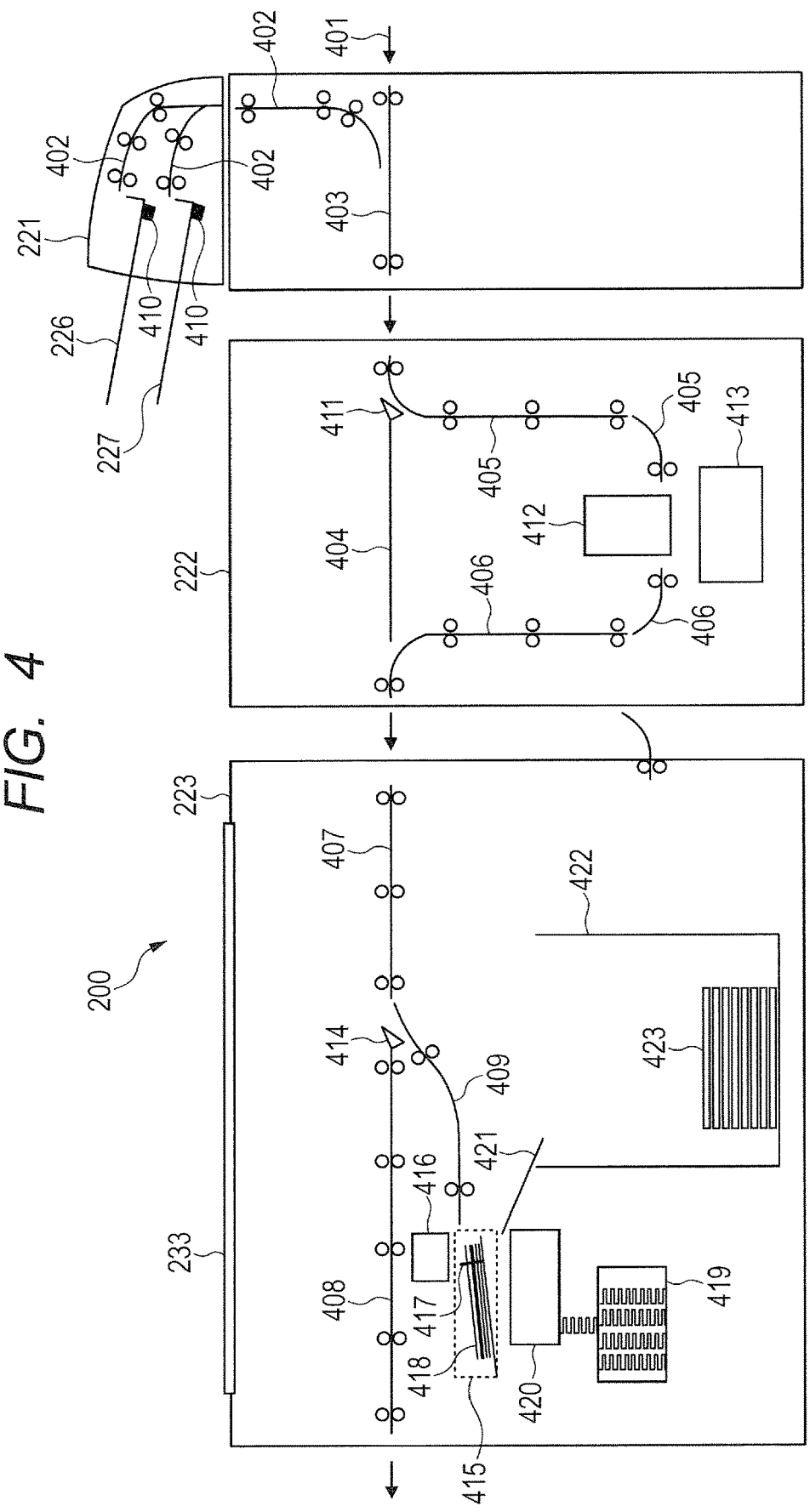
FIG. 4 is a diagram for illustrating a configuration of a sheet processing apparatus.

FIG. 4 is an illustration of the configurations of the bookbinding device 223 and the sheet processing apparatus 200 arranged around the bookbinding device 223 illustrated in FIG. 1. Now, the inserter 221, the punching device 222, the bookbinding device 223, members involved in the bookbinding process of those devices, and a mechanism thereof will be described below. Pairs of members each having a circular shape, which are illustrated in FIG. 4, indicate schematic arrangement of rollers for conveying the sheet.

The image-formed sheet printed by the printer portion 203 is conveyed from a spot indicated by an inserter carry-in path 401 to, in the first embodiment, a conveyance path 403 inside the inserter 221 being a device in the subsequent stage. The inserter 221 is also configured to be able to convey the sheet that does not involve the image formation to the conveyance path 403. Specifically, the inserter 221 is configured to be able to guide the sheet placed on the tray 226 or 227 to the conveyance path 403 via a conveyance path 402. The trays 226 and 227 are each provided with a sensor 410 for discriminating whether or not the paper has been set. The paper that has passed through the conveyance path 403 is guided to the inside of the punching device 222 being a device in the subsequent stage.

In the punching device 222, the paper is guided to a different conveyance path depending on whether or not processing to be conducted by the punching device 222 is necessary. That is, when the processing is unnecessary, the paper is guided to the inside of the bookbinding device 223 being a device in the subsequent stage via a conveyance path 404. Meanwhile, when the processing to be conducted by the punching device 222 is necessary, the paper is guided to a processing portion 412 via a conveyance path 405. The conveyance path for the sheet is switched by controlling a flapper 411 at such a position as to cause the sheet to be guided to a predetermined conveyance path. In the processing portion 412, sheet processing for conducting the punching process on the guided sheet at a predetermined position thereof is executed. A section indicated by a punch chad portion 413 is a spot for accumulating chads. The sheet processed by the processing portion 412 is guided to the inside of the bookbinding device 223 being the device in the subsequent stage via a conveyance path 406. The processing portion 412 and a type of processing conducted by the processing portion 412 will be described later.

The sheet guided to the inside of the bookbinding device 223 via a conveyance path 407 is guided to a different conveyance path depending on whether or not the bookbinding process to be conducted by the bookbinding device 223 is necessary. The conveyance path is switched by controlling a flapper 414 at such a position as to cause the sheet to be guided to a predetermined conveyance path. That is, when the bookbinding process is unnecessary, the sheet is delivered to a device in the subsequent stage via the conveyance path indicated by a conveyance path 408.

Meanwhile, when the bookbinding process is necessary, the sheet is controlled so as to be guided to a conveyance path 409. The sheet guided to the conveyance path 409 is guided to a pile portion 415. In FIG. 4, a binding member 417 and piled sheets 418 are illustrated within the pile portion 415. As described later, the bookbinding process of the first embodiment employs a method of causing the binding member to pass through the sheet subjected to the punching processing by the punching process or the sheet subjected to the punching processing in advance, and subjecting the binding member to deformation processing, to thereby obtain the bookbinding printed product.

Therefore, the sheet guided to the pile portion 415 via the conveyance path 409 needs to be subjected to the punching process having a predetermined format. Specifically, the sheet needs to be subjected to the punching process having such a format as to cause the binding member to pass through the hole portion in the sheet subjected to the punching processing. The binding member and a punching attribute of the punching process will be described later.

The binding member is drawn from a retaining portion 419 for the binding member, and is then cut by a length required for the processing of the sheet. The bookbinding device 223 also includes a binding member supplying portion 420 for accurately arranging the binding member at a predetermined position of the pile portion 415 described above.

When the pile of all the sheets requiring bookbinding processing is completed, the deformation processing for the binding member 417 is conducted by a processing portion 416. The bookbinding printed product subjected to the binding process is obtained by the processing portion 416 as a result of the above-mentioned process. The created bookbinding printed product is guided to a bookbinding printed product tray 422 via a conveyance path 421. FIG. 4 is an illustration of a state under which created bookbinding printed products 423 are stored inside the bookbinding printed product tray 422.

<Description of Punching Tool>

FIG. 5A, FIG. 5B, FIG. 5C, FIG. 5D, FIG. 5E, FIG. 5F, and FIG. 5G are diagrams for illustrating the processing to be conducted on a sheet by the processing portion 412 in the punching device 222 illustrated in FIG. 4.

The processing portion 412 is configured so that the punching tool 501 called "die" illustrated in FIG. 5A can be arranged in a replaceable manner. The punching tool 501 is a die used for the punching process, and it is possible to conduct different kinds of punching processes by replacing the punching tool 501. Now, the punching or other such processing conducted on the sheet by the processing portion 412 will be described below in detail.

The punching tool 501 is an example of a punching member. Each of replaceable punching tools 501 includes a memory configured to store a shape of a hole to be punched in a sheet, an interval between holes, the number of holes, identification information, and other such punching attributes. In this case, the punching tool 501 needs to be compatible with the binding member 417 of the bookbinding device 223. In the first embodiment, it is determined whether or not the binding member 417 of the bookbinding device 223 is compatible with the replaceable punching tool 501, to thereby conduct control for avoiding such a sheet post-process as to exhibit a mismatch. Details of the control will be described later with reference to a flowchart.

A sheet 505 to be processed which is illustrated in FIG. 5C is a sheet to be subjected to the punching process, which has been guided to the processing portion 412 via the conveyance path 405 in FIG. 4. The arrangement of punches 502 is robustly fixed by support columns 503. When a pressure PF is applied from above the punching tool 501 as illustrated in FIG. 5A, the punches 502 are protruded downward as illustrated in FIG. 5B. The punches 502 each have a tip having such a sharp punch shape as to be appropriate for the punching process. As a result, the punching process is conducted on the sheet 505 placed below the punching tool 501. A drill may be used as the punch 502.

The punching tool 501 is provided with different kinds based on the shape, the number of holes, and the like that are required depending on the punching attributes, and is configured so as to be flexibly replaceable. For example, as illustrated in FIG. 5D, in order to obtain a printed product in which two holes 516 each having a circular shape are formed in a sheet 506 subjected to two-hole punching processing, the punching tool 501 having a shape corresponding thereto is arranged on the processing portion 412. Meanwhile, as illustrated in FIG. 5E, in order to obtain a printed product in which four holes 517 each having a rectangular shape are formed in a sheet 507 subjected to four-hole punching processing, the punching tool 501 having a shape corresponding thereto may be arranged on the processing portion 412 in the same manner.

When the punching tool 501 is replaced, the bookbinding device 223 notifies the controller 205 that the punching tool 501 has been changed through the external I/F 202. In another case, after the replacement of the punching tool 501, the operator may operate the operating portion 204 to manually input the kind of a punching tool 501 that has replaced the above-mentioned punching tool 501.

The punching device 222 of the first embodiment is also configured to conduct processing other than the punching process by such a mechanism of the punching device 222 as to conduct processing on the sheet placed below the punching tool 501 by applying a pressure from above the punching tool 501. Specifically, as illustrated in FIG. 5F, it is also possible to conduct processing for putting a crease 509 for facilitating folding at a central portion of a sheet to obtain a sheet 508 subjected to crease putting processing.

The punching process for achieving the bookbinding process will be described below with reference to FIG. 5G for illustrating a sheet 510 subjected to bookbinding punching processing.

As described with reference to FIG. 4, the bookbinding process of the first embodiment presupposes a mechanism of the bookbinding device 223 for stacking sheets so as to engage the fixed binding member 417 with the holes of the sheets subjected to the punching processing. Therefore, irrespective of capability of the punching process based on different kinds of shapes and the number of holes being the above-mentioned punching attributes, the punching device 222 needs to conduct the punching processing by the punching tool 501 having the die appropriate for the bookbinding process, that is, compatible with the binding member 417, at a time of the bookbinding process.

Specifically, the number of holes punched in the sheet needs to be compatible with the binding member 417. This is because, as described above, the binding process requires a process for engaging the binding member 417 with hole portions (sheet holes) 504 of the sheet 510 and deforming the binding member 417.

In addition, an interval 511 between holes and an interval 512 between convex portions of the binding member 417 need to match each other, and the binding member 417 cannot be caused to pass through the hole unless a size 514 of a passing portion of the binding member 417 is smaller than a size 513 of the hole. As described above, those conditions are also derived from the requirement of the process for causing the binding member 417 to pass through the hole portion 504 of the sheet 510 and deforming the binding member 417, which is the mechanism of the bookbinding process.

In this manner, it is mandatory that the punching tool 501 is compatible with the binding member 417 in the punching process involving the bookbinding process in order to complete the print job.

Meanwhile, there exists no subsequent processing depending on the punching process in the case of the process for putting a crease and the normal punching process that does not involve the bookbinding process, and hence it is possible to complete the print job even when the punching tool 501 appropriate for the designated punching process is not necessarily mounted. For example, when the punching tool 501 is not compatible with the type of the punching process designated by the job, it is possible to deliver the sheet to the tray 228 or 229 without conducting the punching process. In this manner, depending on the print job to be executed, control is conducted so that the above-mentioned die and the binding member 417 become compatible with each other when a specific bookbinding process is requested, and otherwise, control is conducted so as to start the process for the print job.

<Description of Binding Step>

FIG. 6A, FIG. 6B, FIG. 6C, and FIG. 6D are schematic diagrams for illustrating a configuration around the pile portion 415 illustrated in FIG. 4, and are used to describe an outline of a mechanism of the binding process.

Figure 6A:
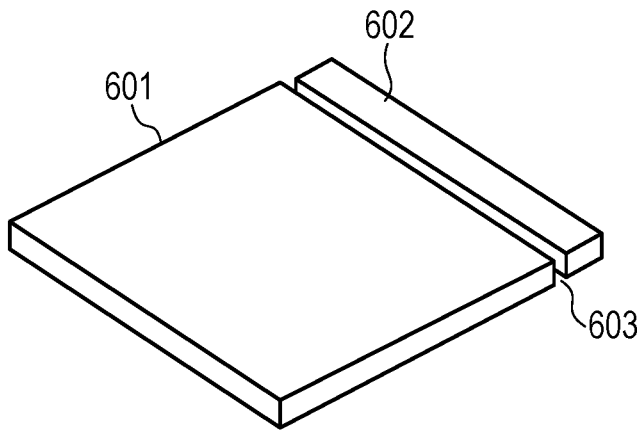
FIG. 6A, FIG. 6B, FIG. 6C, and FIG. 6D are schematic diagrams for illustrating a configuration around a pile portion.

FIG. 6A is an illustration of a state of the pile portion 415 exhibited before the processing is started. Binding member fixing portions 601 and 602 are arranged in parallel with each other. A gap 603 between the binding member fixing portions 601 and 602 is a spot in which the binding member 417 cut by a predetermined length, which is described with reference to FIG. 4, is arranged and fixed.

Figure 6B:
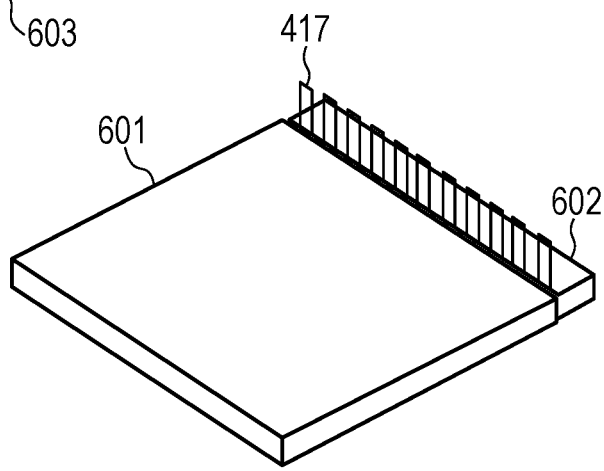
Figure 6C:
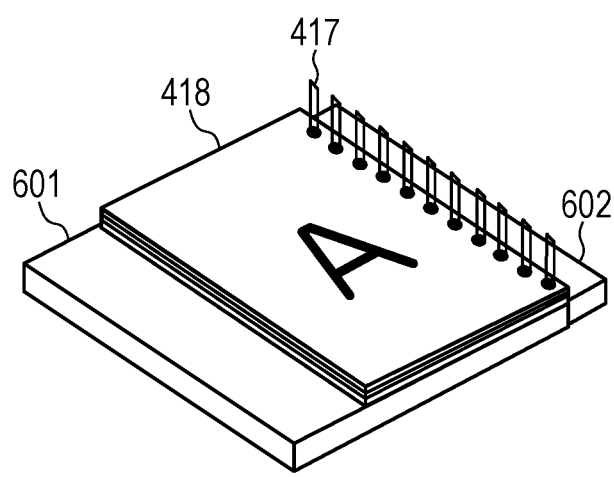
Figure 6D:
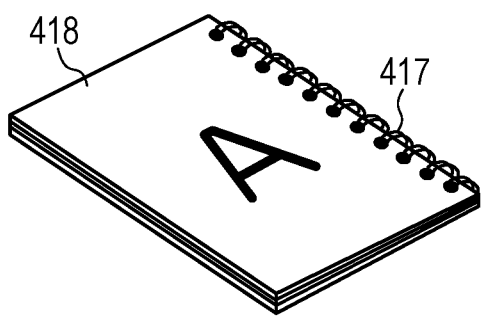

As illustrated in FIG. 6B, after the binding member 417 is supplied to the pile portion 415, the binding member 417 is accurately arranged and fixed at a predetermined position by the binding member fixing portions 602 and 601. Subsequently, the punched sheets are piled in this state so that the binding member 417 passes through the sheets as illustrated in FIG. 6C. The binding member 417 is controlled to be accurately arranged with respect to the number of holes and the position of the sheets conveyed to be piled so that the binding member passes through the sheets. When the piling of up to the last sheet is completed, the binding member 417 is bent and deformed, to thereby obtain such a bookbinding printed product as illustrated in FIG. 6D.

The members that form the pile portion 415 and the shape of the binding member 417 are simplified in order to describe the mechanism of the bookbinding process of the first embodiment, and the present invention is not limited to the shapes illustrated in FIG. 6A and FIG. 6B.

For example, in order to facilitate bending processing, it is conceivable to use a binding member originally having a curved shape instead of the binding member 417 having such a linear shape as illustrated in FIG. 6B. Different kinds of numbers of holes, intervals, shapes, and the like are also conceivable, but the present invention is applied to any form of those attributes as long as the configurations of the appended claims are satisfied.

<Description of Printed Product>

FIG. 7A, FIG. 7B, FIG. 7C, FIG. 7D, and FIG. 7E are diagrams for illustrating states of the binding process conducted by the sheet post-processing apparatus of the first embodiment. In the example, exemplary forms of binding members for printed products obtained as a result of carrying out the bookbinding process are illustrated in cross-section.

Figure 7A:
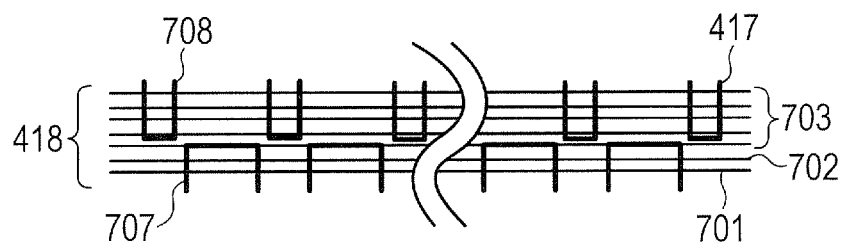
FIG. 7A, FIG. 7B, FIG. 7C, FIG. 7D, and FIG. 7E are diagrams for illustrating states of a binding process conducted by a sheet post-processing apparatus.
Figure 7B:
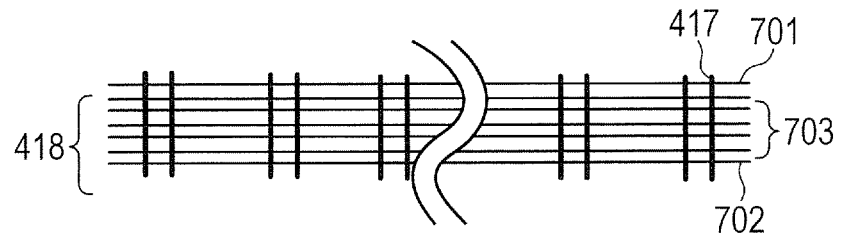

FIG. 7A is an illustration of a state of the printed product from a side on which the sheets are punched. Under that state, a first sheet 701, a second sheet 702, and subsequent sheets 703 have been piled in the pile portion 415 in the stated order of stacking and have been subjected to the binding process as they are. This is a method of bending the binding member 417 that has passed through the punch holes of the sheet bundle so as to have a ring shape, to thereby bind the sheets. Therefore, as illustrated in FIG. 7A, the binding member 417 is formed to have a shape in which a bottom portion 707 of the binding member 417 and the passing portion, that is, an upper portion 708, of the binding member 417 are alternately arranged.

However, the printed product having such a form that the bottom portion 707 and the upper portion 708 (that is, a joint of a ring) of the ring-shaped binding member 417 are exposed to the outside of the printed product is considerably degraded mainly in apparent quality. Therefore, by achieving a state illustrated in FIG. 7B in which the first sheet 701 of the printed product subjected to execution of the binding process has been turned over toward an opposite direction of the bookbinding printed product, it is possible to resolve the state illustrated in FIG. 7A in which the bottom portion 707 and the upper portion 708 are exposed, and to obtain the printed product having apparently preferred quality. In addition, the bookbinding process of the first embodiment presupposes that the sheets of the printed product are stacked in an order that assumes such a process for turning over the first sheet 701 toward the opposite direction.

In addition, the binding member 417 having a predetermined size is supplied to the bookbinding device 223, while the number, or a bundle thickness, of the sheets that form the bookbinding printed product is variable depending on the number of pages of print job data. In order to obtain bookbinding printing products having various bundle thicknesses on the assumption of such a fact, the bookbinding device 223 of the first embodiment presupposes such a configuration as to be able to appropriately create even a bookbinding printed product having a different bundle thickness by enabling the binding member 417 to be replaced by one having a different size.

Figure 7C:
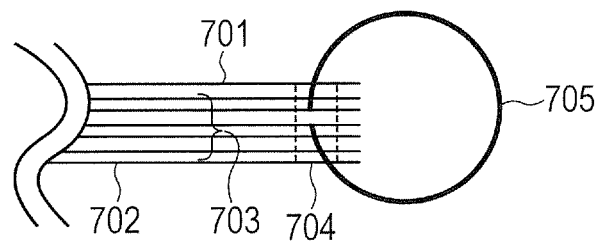
Figure 7D:
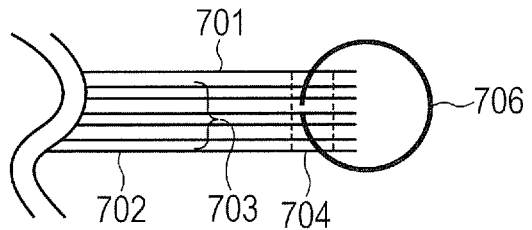
Figure 7E:
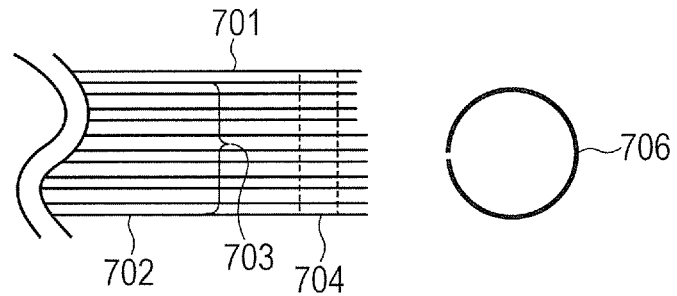

For example, FIG. 7C and FIG. 7D are illustrations of the bookbinding printed products viewed from longitudinal directions of the binding members 705 and 706 in the case of using the binding members 705 and 706 having different sizes. Even the sheet bundles having the same bundle thickness can be subjected to the binding process using the binding members 705 and 706 having different sizes unless the bundle thicknesses exceed the sizes of the binding members 705 and 706. However, a preferred printed product is obtained by using the binding member 705 or 706 having a size appropriate for the bundle thickness. It should be understood that the above-mentioned preference depends on a subjective point of view of the user who uses the MFP 101 or a person who is to obtain the printed product. However, as illustrated in FIG. 7E, when the bundle thickness exceeds the size that enables the binding member 706 to bind the sheet bundle, the bookbinding device 223 cannot execute the process for creating the bookbinding printed product irrespective of the above-mentioned subjective point of view of the user or the person who is to obtain the printed product. In this case, the user has no way of obtaining a normal printed product other than to conduct the process by reducing the bundle thickness or replacing the binding member 705 by one having a larger size. The binding members 705 and 706 each bind the sheets by being bent toward holes 704 of the stacked sheets from both sides to form a ring-shaped loop.

<Description of Image Displayed on Operating Portion 204>

FIG. 8A, FIG. 8B, FIG. 8C, and FIG. 8D are illustrations of UI screens (print setting screens) to be displayed on the operating portion 204 illustrated in FIG. 2. In the example, FIG. 8A to FIG. 8D are a series of bookbinding setting screens.

Figure 8A:
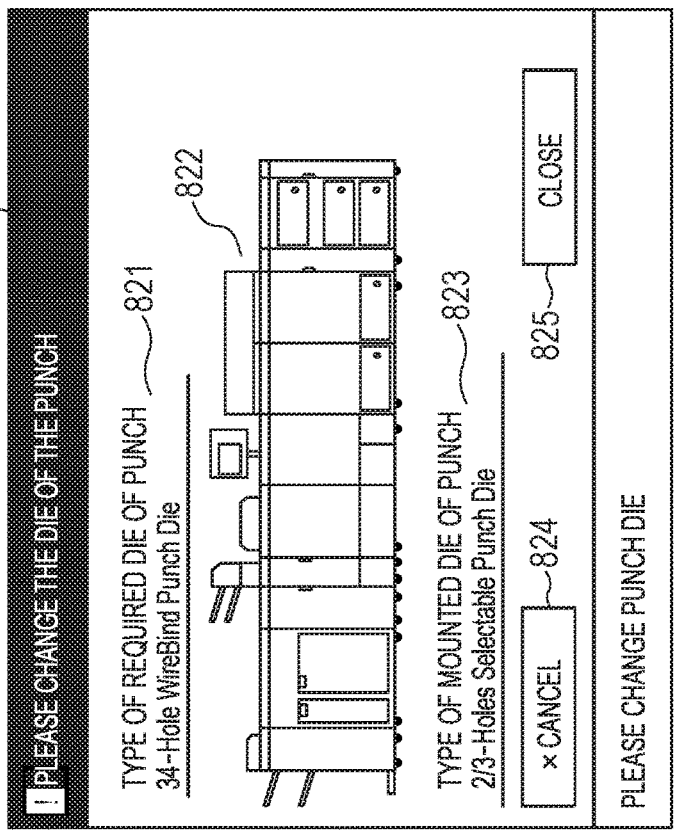
FIG. 8A, FIG. 8B, FIG. 8C, and FIG. 8D are diagrams for illustrating UI screens to be displayed on an operating portion.
Figure 8B:
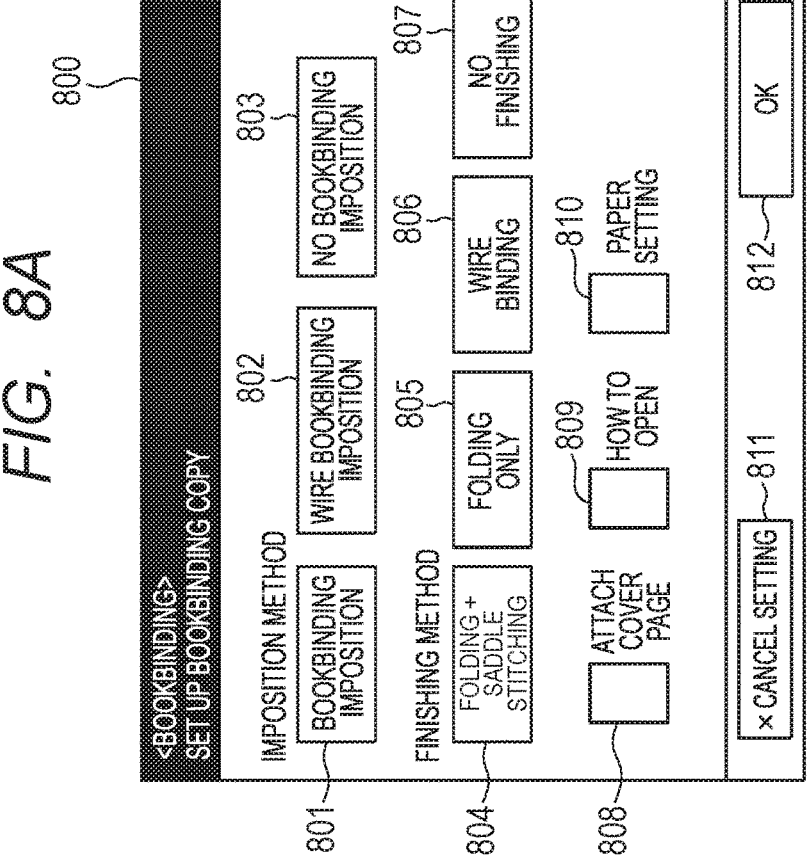
Figure 8C:
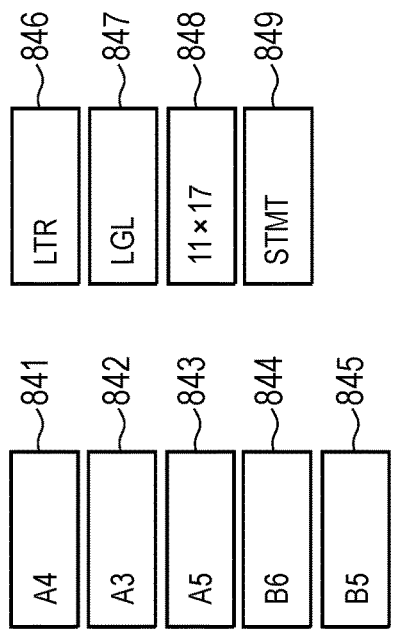
Figure 8D:
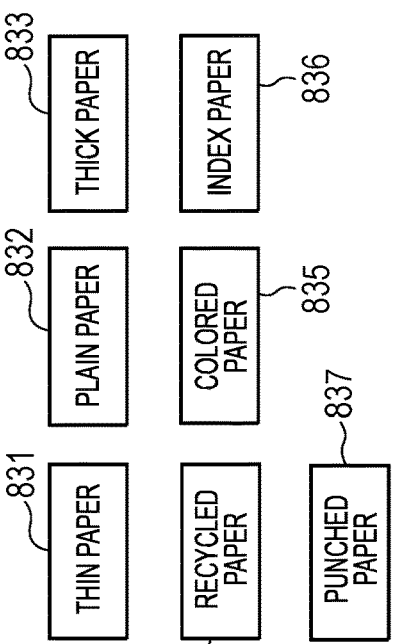

FIG. 8A is the illustration of a bookbinding setting screen 800. FIG. 8B is the illustration of a punch die mismatch error screen 820. FIG. 8C is the illustration of a paper type setting screen 830 among paper setting screens. FIG. 8D is the illustration of a paper size setting screen 840 among the paper setting screens.

As described above, information input to the operating portion 204 by the operator is transmitted to the controller 205, and a screen displayed on the operating portion 204 is switched by an instruction received from the controller 205. The following description will be provided of examples of the screens to be displayed on the operating portion 204 and how a display screen on the operating portion 204 is caused to transition by the operator's operation.

When receiving an instruction to display the bookbinding setting screen from the operator, the controller 205 displays the bookbinding setting screen 800 illustrated in FIG. 8A on the operating portion 204. The bookbinding setting screen 800 is a screen for receiving specific bookbinding setting for the print job. The bookbinding setting screen 800 is one of the screens relating to the setting of copy, and is a screen for designating bookbinding imposition and finishing.

In FIG. 8A, imposition designation buttons 801 to 803 are buttons for designating a method of imposition. A selected imposition designation button is displayed in a color different from the other buttons. A plurality of imposition designation buttons are not simultaneously brought to a selected state. When one imposition designation button is selected with another imposition designation button being already in a selected state, the newly selected imposition designation button is brought to a selected state, and the selected state of the imposition designation button that was previously in the selected state is canceled. When there is a selected state stored in the RAM 208, the selected state is set as an initial state, and when there is no stored selected state, a state under which a no-bookbinding-imposition designation button 803 is selected is set as the initial state.

A bookbinding imposition designation button 801 is one of the imposition designation buttons, and is a button for designating saddle stitching bookbinding imposition. In the saddle stitching bookbinding imposition, images are reordered so that two images are printed on one sheet of paper. In a finishing process, the paper is fold into two at its center to obtain a book-like output product.

A wire bookbinding imposition designation button 802 is one of the imposition designation buttons, and is a button for designating wire bookbinding imposition. As described with reference to FIG. 7A to FIG. 7E, the printed product of wire bookbinding necessitates a change in the order of stacking the paper. Specifically, the stacking order needs to be changed by reordering the images so that the last sheet of paper is to be a back cover is output first.

Through selection of the wire bookbinding imposition designation button 802, a process required for changing the stacking order is carried out. The wire bookbinding imposition designation button 802 is displayed only when the bookbinding device 223 is connected to the MFP 101. In addition, the wire bookbinding imposition designation button 802 is selectable only when the punching tool 501 mounted to the punching device 222 is appropriate for wire binding.

The displaying or hiding of the wire bookbinding imposition designation button 802 and the switching as to whether or not the wire bookbinding imposition designation button 802 is selectable will be described below in detail with reference to FIG. 11.

The no-bookbinding-imposition designation button 803 is one of the imposition designation buttons, and is a button for designating that the bookbinding imposition is not to be conducted. When the bookbinding imposition is not designated, one image is printed on one surface of the paper in order. Designation of single-sided printing or double-sided printing can be set on the normal imposition designation screen (not shown).

Finishing designation buttons 804 to 807 are buttons for designating a method of finishing. A selected finishing designation button is displayed in a color different from the other buttons. A plurality of finishing designation buttons are not simultaneously brought to a selected state. When one finishing designation button is selected with another finishing designation button being already in a selected state, the newly selected finishing designation button is brought to a selected state, and the selected state of the finishing designation button that was previously in the selected state is canceled. When there is a selected state stored in the RAM 208, the selected state is set as the initial state, and when there is no stored selected state, a state under which a no-finishing designation button 807 is selected is set as the initial state.

A folding-and-saddle-stitching designation button 804 is one of the finishing designation buttons, and is a button for designating a process for folding the paper at the center and a process for binding the paper with a staple. It is possible to obtain a book-like printed product subjected to saddle stitching by designating the folding-and-saddle-stitching designation button 804 together with the bookbinding imposition designation button 801.

A folding designation button 805 is one of the finishing designation buttons, and is a button for designating the process for folding the paper at the center. It is possible to obtain a book-like printed product by designating the folding designation button 805 together with the bookbinding imposition designation button 801.

A wire binding designation button 806 is one of the finishing designation buttons, and is a button for designating binding using a wire. It is possible to obtain an output product subjected to the bookbinding process after being bound with a wire by designating the wire binding designation button 806 and the wire bookbinding imposition designation button 802 together. In the same manner as the wire bookbinding imposition designation button 802, the wire binding designation button 806 is displayed only when the bookbinding device 223 is connected to the MFP 101. In addition, the wire binding designation button 806 is selectable only when the punching tool 501 mounted to the punching device 222 is appropriate for the wire binding. This will be described below in detail with reference to FIG. 11.

The no-finishing designation button 807 is one of the finishing designation buttons, and is a button for designating that the finishing is not to be conducted. When the finishing is not conducted, the finishing process involved in the bookbinding is not conducted.

A cover page designation button 808 is a button for designating to add a cover page to the bookbinding printed product. When the cover page designation button 808 is selected, the controller 205 temporarily stores the selected state of the imposition designation buttons 801 to 803 and the finishing designation buttons 804 to 807 in the RAM 208, and displays a cover page setting screen (not shown).

On the cover page setting screen, it is possible to designate a type of paper and a printed surface to be used for the cover page. When the designation of the cover page setting screen is finished, the controller 205 reads the selected state of the buttons stored in the RAM 208, sets the read selected state as the initial state, and then displays the bookbinding setting screen 800 on the operating portion 204.

A how-to-open designation button 809 is a button for designating an opening direction (right-opening, left-opening, or the like) of the bookbinding printed product. When the how-to-open designation button 809 is selected, the controller 205 temporarily stores the selected state of the imposition designation buttons 801 to 803 and the finishing designation buttons 804 to 807 in the RAM 208, and displays a how-to-open setting screen (not shown). On the how-to-open setting screen, it is possible to designate the opening direction of the bookbinding. When the designation of the how-to-open setting screen is finished, the controller 205 reads the selected state of the buttons stored in the RAM 208, sets the read selected state as the initial state, and then displays the bookbinding setting screen 800 on the operating portion 204.

A paper setting button 810 is a button for designating paper to be used. When the paper setting button 810 is selected, the controller 205 temporarily stores the selected state of the imposition designation buttons 801 to 803 and the finishing designation buttons 804 to 807 in the RAM 208, and displays the paper setting screens 830 and 840. The paper setting screens 830 and 840 will be described below with reference to FIG. 8C and FIG. 8D.

When the designation of the paper setting screens 830 and 840 is finished, the controller 205 reads the selected state of the buttons stored in the RAM 208, sets the read selected state as the initial state, and then displays the bookbinding setting screen 800 on the operating portion 204.

A setting cancel button 811 is a button for finishing the bookbinding setting without establishing the bookbinding setting. When the selection of the setting cancel button 811 is received, the designation of an imposition method and a finishing method conducted on the bookbinding setting screen 800, cover page setting conducted on the cover page setting screen, the designation of the opening direction conducted on the how-to-open setting screen, and paper setting conducted on the paper setting screens 830 and 840 are discarded without being stored, and the screen transitions back to a previously-displayed screen.

An OK button 812 is a button for finishing the bookbinding setting. When an instruction for the OK button 812 is received, the designation of the imposition method and the finishing method conducted on the bookbinding setting screen 800, the cover page setting conducted on the cover page setting screen, the designation of the opening direction conducted on the how-to-open setting screen, and the paper setting conducted on the paper setting screens 830 and 840 are stored in the RAM 208 as setting to be used for the print job, and the screen transitions back to a previously-displayed screen.

When a transition is made from the bookbinding setting screen 800 without an instruction for any one of the cover page designation button 808, the how-to-open designation button 809, the paper setting button 810, the setting cancel button 811, and the OK button 812, the designation of the imposition method and the finishing method conducted on the bookbinding setting screen 800, the cover page setting conducted on the cover page setting screen, and the designation of the opening direction conducted on the how-to-open setting screen are discarded. However, in a case of a screen saver or other such screen transition that is temporary and is to return to the bookbinding setting screen 800 after being canceled, the temporarily stored setting is not discarded.

In the print process described later, when it is time to process a print job having the wire binding designated under a state under which the punching tool appropriate for the wire binding is not mounted to the punching device 222, the punch die mismatch error screen 820 of FIG. 8B is displayed on the operating portion 204. The punch die mismatch error screen 820 is a screen for notifying the operator that the punching tool 501 appropriate for the wire binding is not mounted and prompting the user to replace the punching tool. The print job remains in a suspended state until the punching tool 501 is replaced by an appropriate one.

A required punch die indication 821 is an area for displaying a required punching tool. In the area, identification information for identifying the punching tool required for carrying out the wire binding is displayed. The identification information may be not only a product name or a product number of the punching tool but also a management number or a management name defined arbitrarily by the operator.

A punch die replacement procedure indication 822 is a display area for illustrating a procedure required for replacing the punching tool 501. In the display area, not only an image for illustrating a location of the punching tool is displayed, but also a replacement procedure may be displayed with use of animation.

A mounted punch die indication 823 is an area for displaying a currently-mounted punching tool 501. In the area, identification information for identifying the currently-mounted punching tool 501 is displayed. The identification information is equivalent to the identification information displayed in the required punch die indication 821.

A cancel button 824 is a button for canceling the print job. When the selection of the cancel button 824 is received, the received print job is canceled. The setting information and the image data on the print job stored in the HDD 209 are discarded. In addition, the punch die mismatch error screen 820 finishes being displayed on the operating portion 204, and transitions back to a previously-displayed screen.

A close button 825 is a button for finishing displaying the punch die mismatch error screen 820. When the selection of the close button 825 is received, the punch die mismatch error screen 820 finishes being displayed on the operating portion 204, and transitions back to a previously-displayed screen. In this case, the appropriate punching tool 501 is not mounted, and hence the print job remains in a suspended state without being restarted.

When the paper setting button 810 is selected on the bookbinding setting screen 800 by the operator, the controller 205 displays the paper type setting screen 830 of FIG. 8C on the operating portion 204. The paper type setting screen 830 is one of the paper setting screens, and is a screen for setting the type of paper to be used for the print job having the bookbinding designated. In this case, the paper setting screens are divided into two, that is, the paper type setting screen 830 and the paper size setting screen 840 of FIG. 8D, and the paper type setting screen 830 is set to be displayed first, but the setting of both screens can be made on the same screen, or a displaying order may be reversed.

Paper type setting buttons 831 to 837 are buttons for setting the type of paper to be used for the print job. A selected paper type setting button is displayed in a color different from the other buttons. A plurality of paper type setting buttons are not simultaneously brought to a selected state. When one paper type setting button is selected with another paper type setting button being already in a selected state, the newly selected paper type setting button is brought to a selected state, and the selected state of the paper type setting button that was previously in the selected state is canceled. When there is a selected state stored in the RAM 208, the selected state is set as the initial state, and when there is no stored selected state, a state under which a plain paper button 832 is selected is set as the initial state.

A setting cancel button 838 is a button for finishing setting the type of paper. When the selection of the setting cancel button 838 is received, the paper setting conducted on the paper type setting screen 830 and the paper size setting screen 840 is discarded without being stored, and a transition is made to the bookbinding setting screen 800.

A next button 839 is a button for finishing setting the type of paper. When the selection of the next button 839 is received, the selected state of the paper type setting buttons 831 to 837 is temporarily stored in the RAM 208, and a transition is made to the paper size setting screen 840.

When the next button 839 is selected on the paper type setting screen 830 by the operator, the controller 205 displays the paper size setting screen 840 illustrated in FIG. 8D on the operating portion 204. The paper size setting screen 840 is a screen for setting the size of paper to be used for the print job.

Paper size setting buttons 841 to 849 are buttons for setting the size of paper to be used for the print job. A selected paper size setting button is displayed in a color different from the other buttons. A plurality of paper size setting buttons are not simultaneously brought to a selected state. When one paper size setting button is selected with another paper size setting button being already in a selected state, the newly selected paper size setting button is brought to a selected state, and the selected state of the paper size setting button that was previously in the selected state is canceled. When there is a selected state stored in the RAM 208, the selected state is set as the initial state, and when there is no stored selected state, a state under which an A4 button 841 is selected is set as the initial state.

A setting cancel button 850 is a button for finishing setting a paper size. When the selection of the setting cancel button 850 is received, the paper setting conducted on the paper type setting screen 830 and the paper size setting screen 840 is discarded without being stored, and a transition is made to the bookbinding setting screen 800.

The OK button 851 is a button for finishing setting the paper size. When the selection of the OK button 851 is received, the type of paper and the paper size that are set on the paper type setting screen 830 and the paper size setting screen 840 are stored in the RAM 208 as paper setting for the paper to be used for the print job.

<Flowchart at MFP Startup>

FIG. 9 is a flowchart for illustrating a control method for the image forming apparatus according to the first embodiment. The example corresponds to a processing procedure of the controller 205 for a part particularly relating to the first embodiment within the processing conducted at startup of the MFP illustrated in FIG. 1. The respective steps are achieved by the CPU included in the controller 205 executing the stored control programs.

In Step S901, the controller 205 conducts MFP startup processing. The processing is equivalent to processing conducted at normal startup of the MFP, and hence a description thereof is omitted. When the MFP startup processing is finished, the controller 205 advances the processing to Step S902.

In Step S902, the controller 205 obtains presence/absence of the mounted punching device 222, and stores the presence/absence in the RAM 208. The presence/absence of the mounted punching device 222 is obtained by communicating to/from the punching device 222 via the external I/F 202. That is, the punching device 222 is mounted while such communications are established. When the controller 205 stores the presence/absence of the punching device 222 in the RAM 208, the controller 205 advances the processing to Step S903.

In Step S903, the controller 205 determines whether or not the punching device 222 is mounted based on a result of the obtainment conducted in Step S902. When the controller 205 determines that the punching device 222 is mounted, the controller 205 advances the processing to Step S904. When the controller 205 determines that the punching device 222 is not mounted, the controller 205 advances the processing to Step S905.

In Step S904, the controller 205 communicates to/from the punching device 222 via the external I/F 202, obtains information on a type of punching tool stored in the memory included in the punching device 222, and stores the information in the RAM 208. The information to be obtained is the identification information for identifying the type of punching tool, and includes a name, the product number, and a registration number of the punching tool 501 and the number of punches 502. When the controller 205 stores the type of the punching tool 501 identified from the obtained information in the RAM 208, the controller 205 advances the processing to Step S905.

In Step S905, the controller 205 obtains presence/absence of the bookbinding device 223 mounted to the MFP 101, and stores the presence/absence in the RAM 208. The presence/absence of the mounted bookbinding device 223 is obtained by communicating to/from the punching device 222 via the external I/F 202 or by directly communicating to/from the bookbinding device 223. When the controller 205 stores the presence/absence of the bookbinding device 223 in the RAM 208, the controller 205 brings the processing conducted at the startup of the MFP to an end.

<Flowchart at Standby State>

Figure 10:
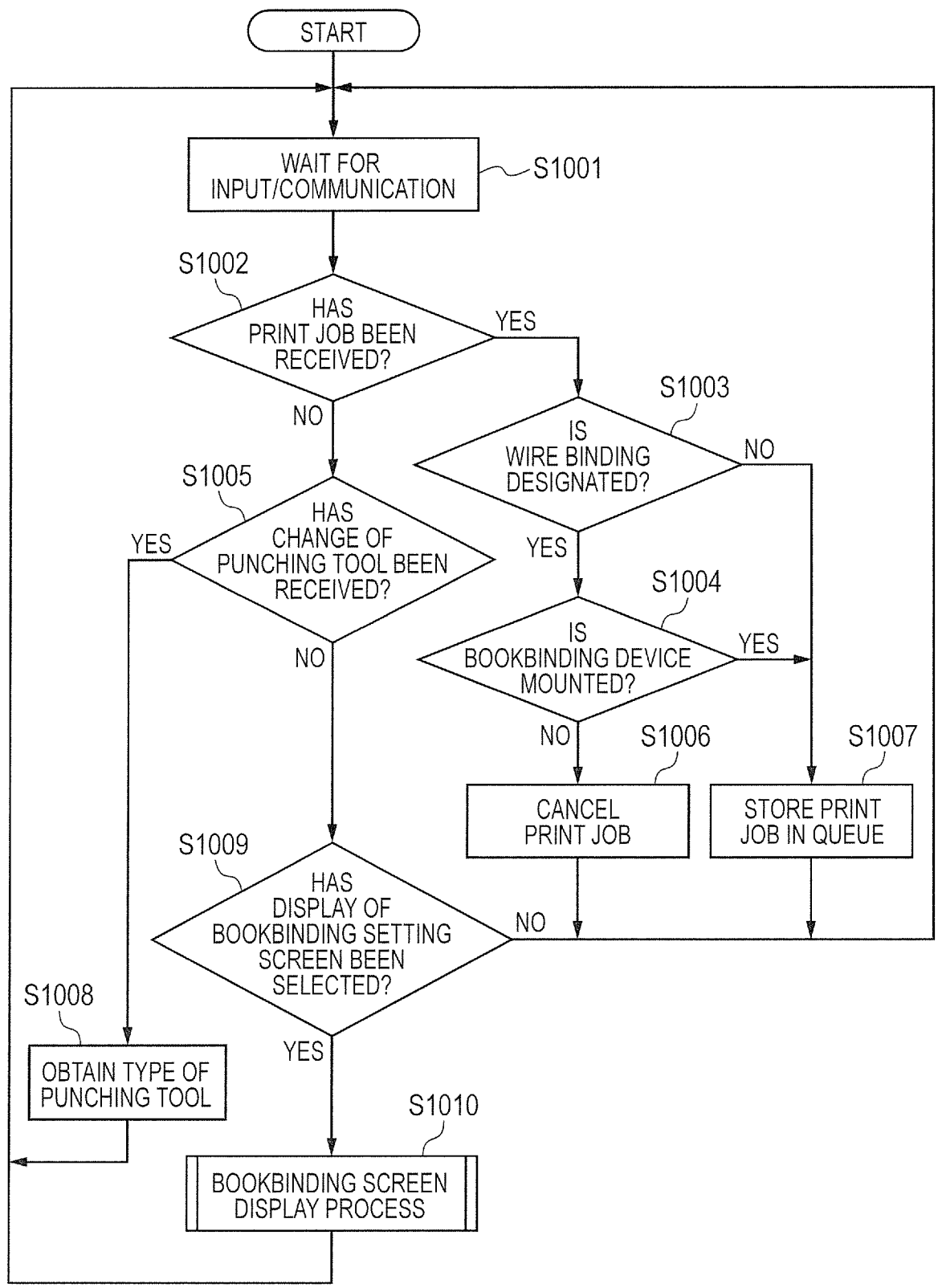
FIG. 10 is a flowchart for illustrating the control method for the image forming apparatus.

FIG. 10 is a flowchart for illustrating a control method for the image forming apparatus according to the first embodiment. The example corresponds to a processing procedure of the controller 205 for conducting the bookbinding setting for the print job or receiving the print job under a standby state. The respective steps are achieved by the CPU included in the controller 205 executing the stored control programs.

In Step S1001, the controller 205 waits for the operator's input and a communication from the connected device. When receiving the input from the operator or receiving the communication from the connected device, the controller 205 advances the processing to Step S1002. Meanwhile, when the controller 205 determines that there is no input or no communication, the controller 205 waits for the subsequent processing in Step S1001.

In Step S1002, the controller 205 determines whether or not the communication received from the connected device in Step S1001 is the reception of the print job via the external I/F 202. In this case, when the controller 205 determines that the print job has been received, the controller 205 advances the processing to Step S1003, and when the controller 205 determines that the print job has not been received, the controller 205 advances the processing to Step S1005.

In Step S1003, the controller 205 analyzes the print job received in Step S1001, and determines whether or not the wire binding is designated. In this case, when the controller 205 determines that the wire binding is designated, the controller 205 advances the processing to Step S1004, and when the controller 205 determines that the wire binding is not designated, the controller 205 advances the processing to Step S1007.

Step S1003 may be conducted in processing at start of print job processing described later with reference to FIG. 11. In that case, the controller 205 advances the processing from Step S1002 to Step S1007 without executing Step S1003 or Step S1004.

In Step S1004, the controller 205 refers to the presence/absence of the bookbinding device 223, which is stored in the RAM 208 in Step S905, to determine whether or not the bookbinding device 223 is mounted. In this case, when the controller 205 determines that the bookbinding device 223 is mounted, the controller 205 advances the processing to Step S1007, and when the controller 205 determines that the bookbinding device 223 is not mounted, the controller 205 advances the processing to Step S1006.

In Step S1006, the controller 205 cancels the received print job. Specifically, the controller 205 deletes the setting information and the image data on the print job stored in the HDD 209, and confirms cancel processing. After that, the controller 205 returns the processing to Step S1001.

In Step S1007, the controller 205 stores the received print job in a job queue secured in the RAM 208 in order to set the print job pending, and after that, the controller 205 returns the processing to Step S1001.

Meanwhile, in Step S1005, the controller 205 determines whether or not the operator's input and the communication from the connected device, which are received in Step S1001, relate to a notification of the change of the punching tool 501, which is received from the punching device 222 via the external I/F 202, or an operation for inputting the type of the punching tool 205 mounted after the change, which is conducted through the operating portion 204 by the operator. In this case, when the controller 205 determines that the notification of the change of the punching tool 501 has been received, the controller 205 advances the processing to Step S1008, and when the controller 205 determines that the notification of the change of the punching tool 501 has not been received, the controller 205 advances the processing to Step S1009.

In Step S1008, the controller 205 obtains the information (identification information) for identifying the mounted punching tool 501, and stores the information in the RAM 208. When the controller 205 determines that the RAM 208 already stores the information for identifying the punching tool 501, the controller 205 updates the already-obtained information on the punching tool 501 by the obtained information.

The information received in Step S1005 may include information relating to the type of the punching tool 501 mounted to the bookbinding device 223.

The controller 205 may obtain the information on the type of the punching tool 501 from the punching device 222 through a communication different from that of Step S1005. In this manner, when the controller 205 stores the type of the punching tool 501 in the RAM 208, the controller 205 advances the processing to Step S1001.

Subsequently, in Step S1009, the controller 205 determines whether or not the operator's input received in Step S1001 relates to an instruction to display a bookbinding setting screen. In this case, when the controller 205 determines that the operator's input relates to the instruction to display the bookbinding setting screen, the controller 205 advances the processing to Step S1010, and when the controller 205 determines that the operator's input does not relate to the instruction to display the bookbinding setting screen, the controller 205 advances the processing to Step S1001.

Subsequently, in Step S1010, the controller 205 conducts processing for displaying a bookbinding screen on the display 235 of the operating portion 204. The processing for displaying the bookbinding screen will be described below with reference to FIG. 11. In this manner, when the processing for displaying the bookbinding screen is finished, the controller 205 returns the processing to Step S1001.

<Flowchart of Wire Bookbinding Setting Screen Displaying Processing>

Figure 11:
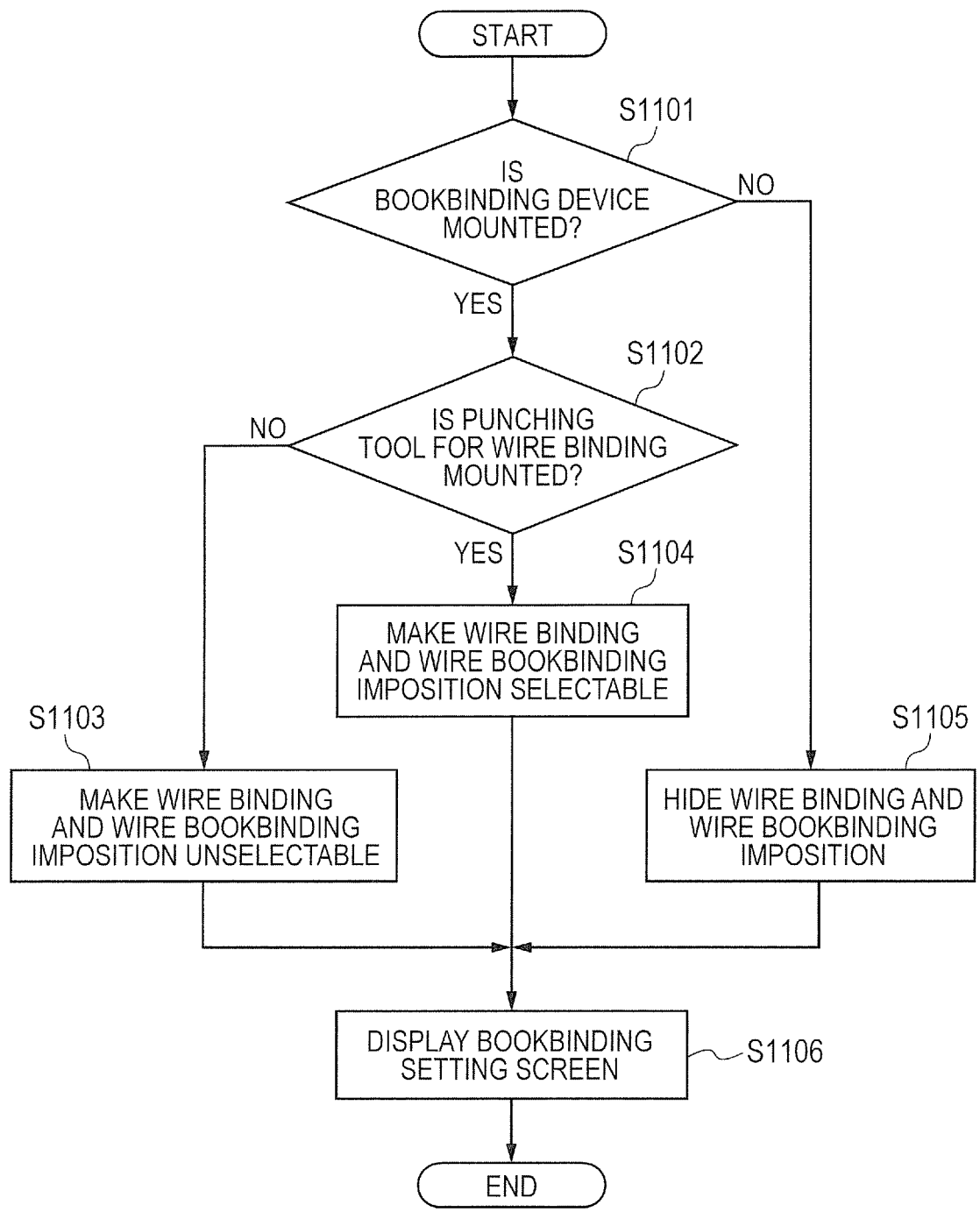
FIG. 11 is a flowchart for illustrating the control method for the image forming apparatus.

FIG. 11 is a flowchart for illustrating the control method for the image forming apparatus of the first embodiment. The example relates to a processing procedure of the controller 205 conducted when the instruction to display the bookbinding setting screen is received. The respective steps are achieved by the CPU included in the controller 205 executing the stored control programs. Now, a description will be provided of an example of conducting control so that the bookbinding setting involving the use of the bookbinding device 223 is inhibited from being selected on the print setting screen when the controller 205 determines that a punching member mounted to a first device is not compatible with the binding member 417 used by the bookbinding device 223 being a second device. The controller 205 compares specifications of the mounted punching member with specifications of the binding member used by the bookbinding device 223. With this comparison, the controller 205 determines whether or not the punching member mounted to the first device is compatible with the binding member 417 used by the bookbinding device 223 being the second device. More specifically, the controller 205 determines based on the information obtained from the bookbinding device 223 and the punching device 222 whether or not a size of a convex portion of the binding member matches a size of the punched hole or whether or not an interval between a hole to be punched and the adjacent hole to be punched matches an interval between the convex portions of the binding member.

In Step S1101, the controller 205 refers to the information indicating the presence/absence of the bookbinding device 223, which is stored in the RAM 208 in Step S905, to determine whether or not the bookbinding device 223 is mounted. In this case, when the controller 205 determines that the bookbinding device 223 is mounted, the controller 205 advances the processing to Step S1102, and when the controller 205 determines that the bookbinding device 223 is not mounted, the controller 205 advances the processing to Step S1105.

In Step S1102, the controller 205 refers to the information on the type of the punching tool 501, which is stored in the RAM 208 in Step S904 or Step S1008, to determine whether or not the mounted punching tool 501 is appropriate for the wire binding. In this case, when the controller 205 determines that the punching tool 501 appropriate for the wire binding is mounted, the controller 205 advances the processing to Step S1104, and when the controller 205 determines that the punching tool 501 appropriate for the wire binding is not mounted, the controller 205 advances the processing to Step S1103. In this case, a state under which the punching tool 501 appropriate for the wire binding is mounted represents a state under which the size of the hole to be punched by the punching tool 501, the position of the hole, the number of holes, and the like match those of a wire binding configuration of the bookbinding device 223.

In Step S1103, the controller 205 determines that the wire bookbinding imposition designation button 802 and the wire binding designation button 806 on the bookbinding setting screen 800 displayed on the display 235 of the operating portion 204 are to be made unselectable. In this case, an unselectable state represents a state under which the controller 205 displays a button on the display 235 of the operating portion 204 while conducting such display control as to distinguish the button from another button by, for example, graying out the button, to thereby inhibit the user from selecting the designation of the wire binding.

When the controller 205 completes the processing of Step S1103 for determining that the wire bookbinding imposition designation button 802 and the wire binding designation button 806 on the bookbinding setting screen 800 are to be made unselectable, the controller 205 advances the processing to Step S1106.

Meanwhile, in Step S1104, the controller 205 determines that the wire bookbinding imposition designation button 802 and the wire binding designation button 806 on the bookbinding setting screen 800 are to be made selectable. After that, the controller 205 advances the processing to Step S1106.

When the controller 205 determines in Step S1105 that the wire bookbinding imposition designation button 802 and the wire binding designation button 806 are to be made hidden, the controller 205 advances the processing to Step S1106.

In Step S1106, the controller 205 displays the bookbinding setting screen 800 on the display 235 of the operating portion 204. The bookbinding setting screen 800 has been described above with reference to FIG. 8A. After displaying the bookbinding setting screen on the operating portion 204, the controller 205 brings the flow of bookbinding setting screen displaying processing to an end.

<Flowchart at Start of Print Job Processing>

Figure 12:
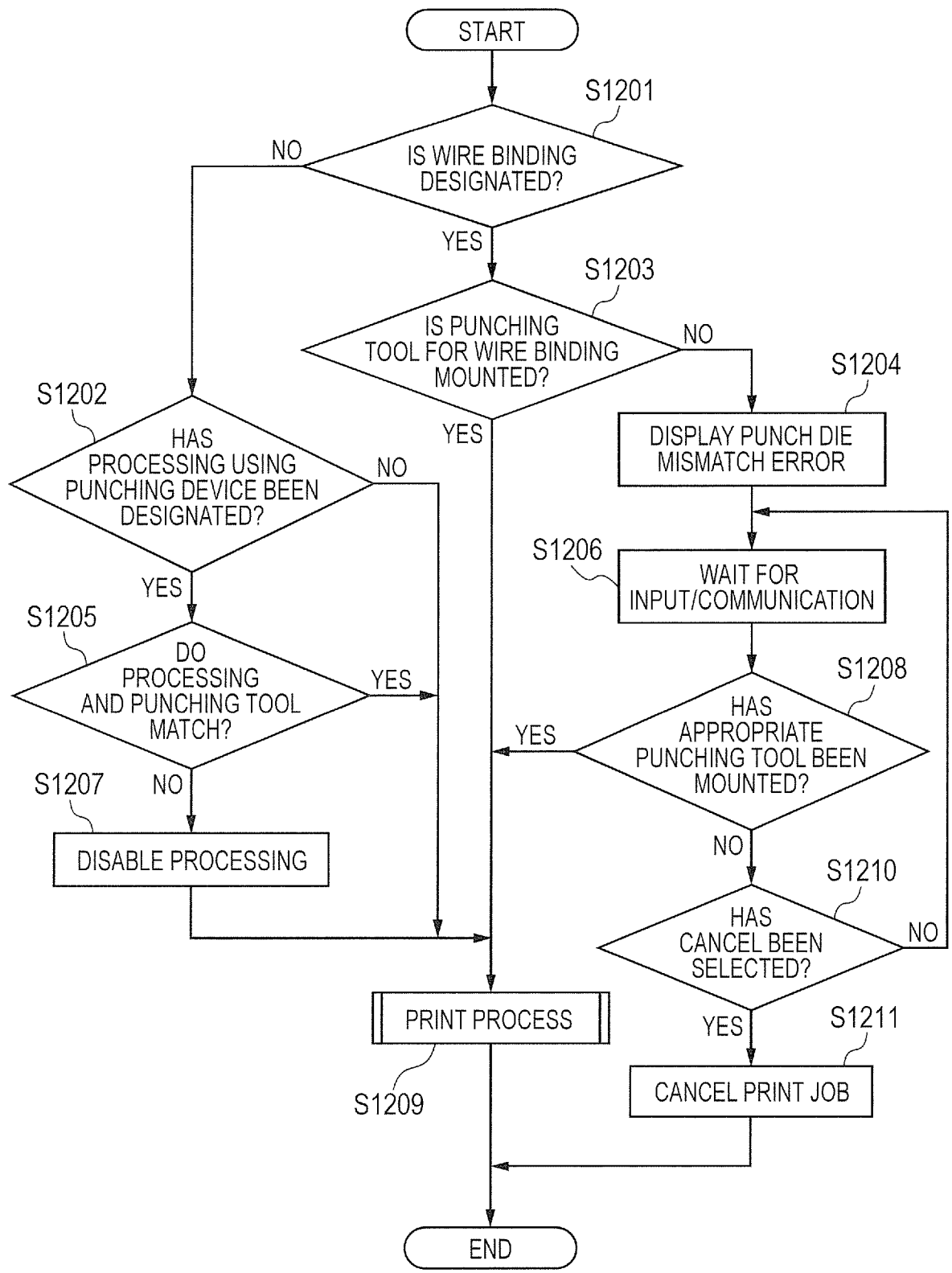
FIG. 12 is a flowchart for illustrating the control method for the image forming apparatus.

FIG. 12 is a flowchart for illustrating the control method for the image forming apparatus of the first embodiment. The example relates to a control procedure of the controller 205 conducted when the processing for the print job is started. The respective steps are achieved by the CPU included in the controller 205 executing the stored control programs. In the processing, the controller 205 monitors the print job queue secured in the RAM 208, and when a print job is stored in the print job queue, starts the processing for the first print job.

Now, a case in which the execution of the print job is inhibited when a wire binding process and the punching process for punching the sheet are not compatible with each other with the wire binding bookbinding process being designated in the print job and the inhibited print job is resumed and a case in which the execution of the print job is canceled on the above-mentioned occasion will be described below separately.

In Step S1201, the controller 205 refers to the setting of the print job stored in the HDD 209, which is received through the network, to determine whether or not the wire binding is designated. In this case, when the controller 205 determines that the wire binding is designated, the controller 205 advances the processing to Step S1203, and when determining that the wire binding is not designated, the controller 205 advances the processing to Step S1202.

In Step S1202, the controller 205 refers to the setting of the print job stored in the HDD 209 to determine whether or not the processing using the punching device 222 is designated. As described above with reference to FIG. 5A to FIG. 5G, the processing includes processing for putting a crease in addition to the punching process. In this case, when the controller 205 determines that the processing using the punching device 222 is designated, the controller 205 advances the processing to Step S1205, and when determining that such processing is not designated, the controller 205 advances the processing to Step S1209.

In Step S1205, the controller 205 refers to the information on the type of the punching tool 501, which is stored in the RAM 208 in Step S904 or Step S1008, to determine whether or not the mounted punching tool 501 is appropriate for the designated processing. In this case, when the controller 205 determines that the mounted punching tool 501 is appropriate for the designated processing, the controller 205 advances the processing to Step S1209. Meanwhile, when the controller 205 determines in Step S1205 that the punching tool 501 appropriate for the designated processing is not mounted, the controller 205 advances the processing to Step S1207.

In Step S1207, the controller 205 changes the setting of the print job, and disables the processing. That is, the print job is changed so as to inhibit the processing using the punching device. The controller 205 stores the changed print job in the HDD 209. The changed print job may be stored in the HDD 209, to thereby cause the change of the print job to become permanent. In another case, the controller 205 may hold the changed print job in the RAM 208, to thereby cause the change to become temporary. In this manner, when the controller 205 finishes changing the print job, the controller 205 advances the processing to Step S1209.

Meanwhile, in Step S1203, the controller 205 refers to the information on the type of the punching tool 501, which is stored in the RAM 208 in Step S904 or Step S1008, to determine whether or not the mounted punching tool 501 is appropriate for the wire binding. In this case, when the controller 205 determines that the punching tool 501 appropriate for the wire binding is mounted, the controller 205 advances the processing to Step S1209. Meanwhile, when the controller 205 determines in Step S1203 that the punching tool 501 appropriate for the wire binding is not mounted, the controller 205 advances the processing to Step S1204.

In Step S1204, the controller 205 displays the punch die mismatch error screen 820 for indicating a state under which the punch and the die exhibit a mismatch, which is illustrated in FIG. 8B, on the operating portion 204. After displaying the punch die mismatch error screen 820, the controller 205 advances the processing to Step S1206. Subsequently, in Step S1206, the controller 205 waits for the operator's input and the communication from the connected device. In this case, when the controller 205 receives the input from the operator or receives the communication from the connected device, the controller 205 advances the processing to Step S1208. Meanwhile, when the controller 205 determines in Step S1206 that there is no input/communication, the controller 205 executes Step S1206 again.

In this case, the notification of the change of the punching tool 501 is received from the punching device 222 via the external I/F 202, or the operator operates the operating portion 204 to perform an operation for inputting the type of the punching tool 205 mounted after the change.

In Step S1208, the controller 205 refers to the information of the type of the punching tool 205 mounted after the change, which is input through the operating portion 204 by the operator in Step S1206, and the information on the type of the punching tool 501 stored in the RAM 208 to determine whether or not the punching tool 501 appropriate for the wire binding has been mounted. In this case, when the controller 205 determines that the punching tool 501 appropriate for the wire binding has been mounted, the controller 205 advances the processing to Step S1209.

Meanwhile, when the controller 205 determines that the notification received in Step S1206 is not the notification of the change of the punching tool 501 received from the punching device 222 via the external I/F 202 or that the punching tool 501 appropriate for the wire binding has not been mounted, the controller 205 advances the processing to Step S1210.

In Step S1210, the controller 205 determines that the operator's input received in Step S1206 is an instruction to cancel the print job. In this case, when the controller 205 determines that the instruction to cancel the print job has been received, the controller 205 advances the processing to Step S1211. Meanwhile, when the controller 205 determines that the operator's input received in Step S1206 does not indicate the reception of the instruction to cancel the print job, the controller 205 returns the processing to Step S1206.

In Step S1211, the controller 205 cancels the print job based on the instruction to cancel the print job, which is received as the operator's input in Step S1206. Specifically, the controller 205 deletes the image data and the setting information relating to the print job, which are stored in the HDD 209, and removes the print job from the print job queue. When the controller 205 cancels the print job based on the instruction to cancel the print job, which is received as the operator's input in Step S1206, the controller 205 brings the flow at the start of the print job processing to an end.

In Step S1209, the controller 205 conducts the print process of the print job. The process is the same as a normal print process.

The print job determined to have the wire binding designated in Step S1201 includes, in the print process, a punching step described with reference to FIG. 5A to FIG. 5G and the binding step described with reference to FIG. 6A to FIG. 6D. When the print process is finished, the print job is removed from the print job queue, and the flow at the start of the print job processing is brought to an end. With the above-mentioned configuration, the operator does not need to recognize the type of the mounted punching tool before the print job is input, and when an inappropriate punching tool is mounted, the processing is suspended.

Before the print job is started, the operator is notified that the die to be used for the punching (currently-set die) is not compatible with the binding member to be used for the bookbinding. Therefore, the operator can obtain a printed product on which a desired sheet post-process has been executed by, for example, replacing the punching tool based on the notified instruction.

According to the image forming apparatus achieved in the first embodiment, it is possible to determine whether or not an appropriate punching tool is mounted, and when the appropriate punching tool is not mounted, to inhibit the operator from designating the wire binding in the print job through an operating portion.

When the image forming apparatus receives the print job having the wire binding designated under the state under which the appropriate punching tool is not mounted, an error is displayed on the operating portion at the time of starting the processing for the print job, and the processing for the print job is suspended.

This can prevent the operator from creating an unintended printed product or wasting a binding member, paper, toner, or other such consumables.

According to the first embodiment, it is possible to prevent the execution of the print job having the wire binding designated from being started under the state under which the wire binding cannot be executed.

Second Embodiment

The first embodiment will be described above by taking a case in which it is determined based on compatibility between the bookbinding device 223 and the punching tool 501 whether or not the wire binding can be designated in the print job and whether or not the processing for the print job can be started.

However, the appropriate punching tool 501 and the appropriate punch 502 may differ depending on the size of paper, or there exists a type of paper that does not require the punching step.

Therefore, a description will be provide of a second embodiment adapted to the above-mentioned issue. The flow of the processing conducted at the startup of the MFP is the same as that of FIG. 9, and the flow of the processing conducted under the standby state is the same as that of FIG. 10. In the following description, like components are denoted by like reference numerals.

<Flowchart of Bookbinding Setting Screen Displaying Processing>

Figure 13:
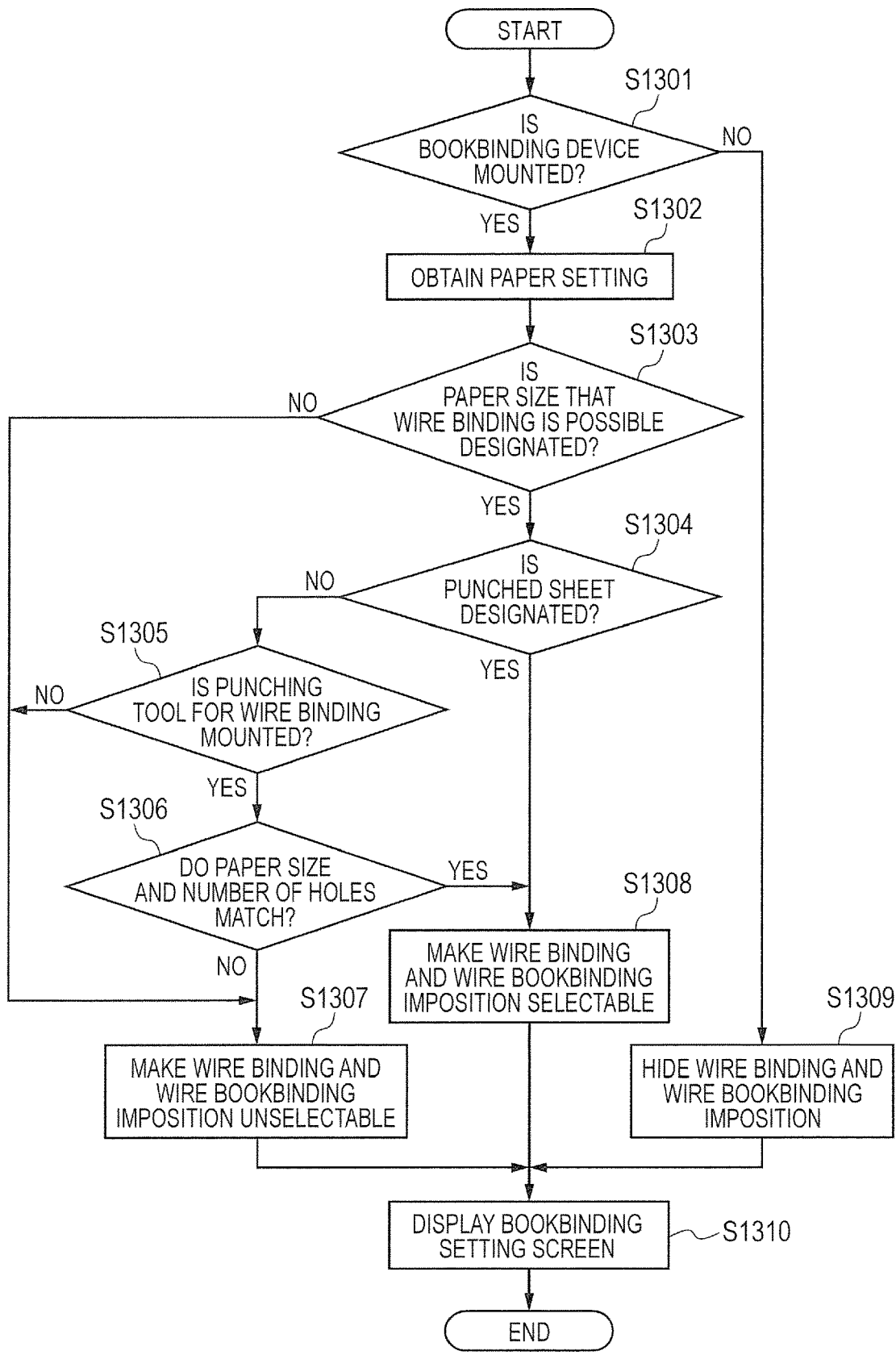
FIG. 13 is a flowchart for illustrating the control method for the image forming apparatus.

FIG. 13 is a flowchart for illustrating a control method for an image forming apparatus of the second embodiment. The example relates to a processing procedure of the controller 205 for displaying the bookbinding setting screen. The respective steps are achieved by the CPU included in the controller 205 executing the stored control programs. The description is made below while omitting the same processing as that of the first embodiment.

The processing of Step S1301 is the same as the processing of Step S1101. In Step S1302, the controller 205 obtains the paper setting stored in the RAM 208 as the paper setting for the paper to be used for the print job. The paper setting includes the type of paper and the size of paper. The paper setting has already been described with reference to FIG. 8C and FIG. 8D. After the controller 205 obtains the paper setting, the controller 205 advances the processing to Step S1303.

In Step S1303, the controller 205 determines whether or not the paper size of the obtained paper setting is a paper size that the wire binding is possible. In this case, when the controller 205 determines that the obtained paper size is the paper size that the wire binding is possible, the controller 205 advances the processing to Step S1304. Meanwhile, when the controller 205 determines that the obtained paper size is not the paper size that the wire binding is possible, the controller 205 advances the processing to Step S1307.

In Step S1304, the controller 205 determines whether or not a paper type of the obtained paper setting is punched paper. In this case, when the controller 205 determines that the paper type is the punched paper, the controller 205 advances the processing to Step S1308. Meanwhile, when the controller 205 determines that the paper type is not the punched paper, the controller 205 advances the processing to Step S1305. The processing of Step S1305 is the same as the processing of Step S1102 illustrated in FIG. 11.

In Step S1306, the controller 205 compares the paper size of the obtained paper setting with the type of the punching tool 501 stored in the RAM 208, and comparatively determines whether or not the number of holes to be punched by the punches 502 is appropriate for the paper size. For example, 34 holes are required when A4-size paper is subjected to the wire binding, and 32 holes are required when LTR-size paper is subjected to the wire binding. Therefore, in Step S1306, the controller 205 compares the required number of holes depending on a difference in paper size with the number of holes to be punched by the punches 502.

When the number of holes to be punched by the punches 502 is determined uniquely by the type of the punching tool 501, the controller 205 may conduct the comparison of Step S1306 in terms of the type of the punching tool 501, and otherwise, may conduct the comparison by obtaining the number of punches 502 directly through communications to/from the punching device 222 or through the operator's input. When the controller 205 determines as a result of conducting the comparison in Step S1306 that the paper size matches the number of holes to be punched by the punches 502, the controller 205 advances the processing to Step S1308. Meanwhile, when the controller 205 determines in Step S1306 that the paper size does not match the number of punches 502, the controller 205 advances the processing to Step S1307. The processing of from Step S1307 to Step S1309 is the same as the processing of from Step S1103 to Step S1105.

In Step S1310, the controller 205 displays the bookbinding setting screen 800 on the operating portion 204. At this time, in a case where Step S1307 has already been executed, even when the selected state of the imposition designation buttons 801 to 803 and the finishing designation buttons 804 to 807, which is temporarily stored in the RAM 208, is the wire bookbinding imposition designation button 802 and the wire binding designation button 806, the controller 205 discards the setting of those buttons. In that case, the controller 205 controls the screen display of the operating portion so as to set a state under which the no-bookbinding-imposition designation button 803 and the no-finishing designation button 807 are selected as the initial state.

<Flowchart of Start of Print Job Processing>

Figure 14:
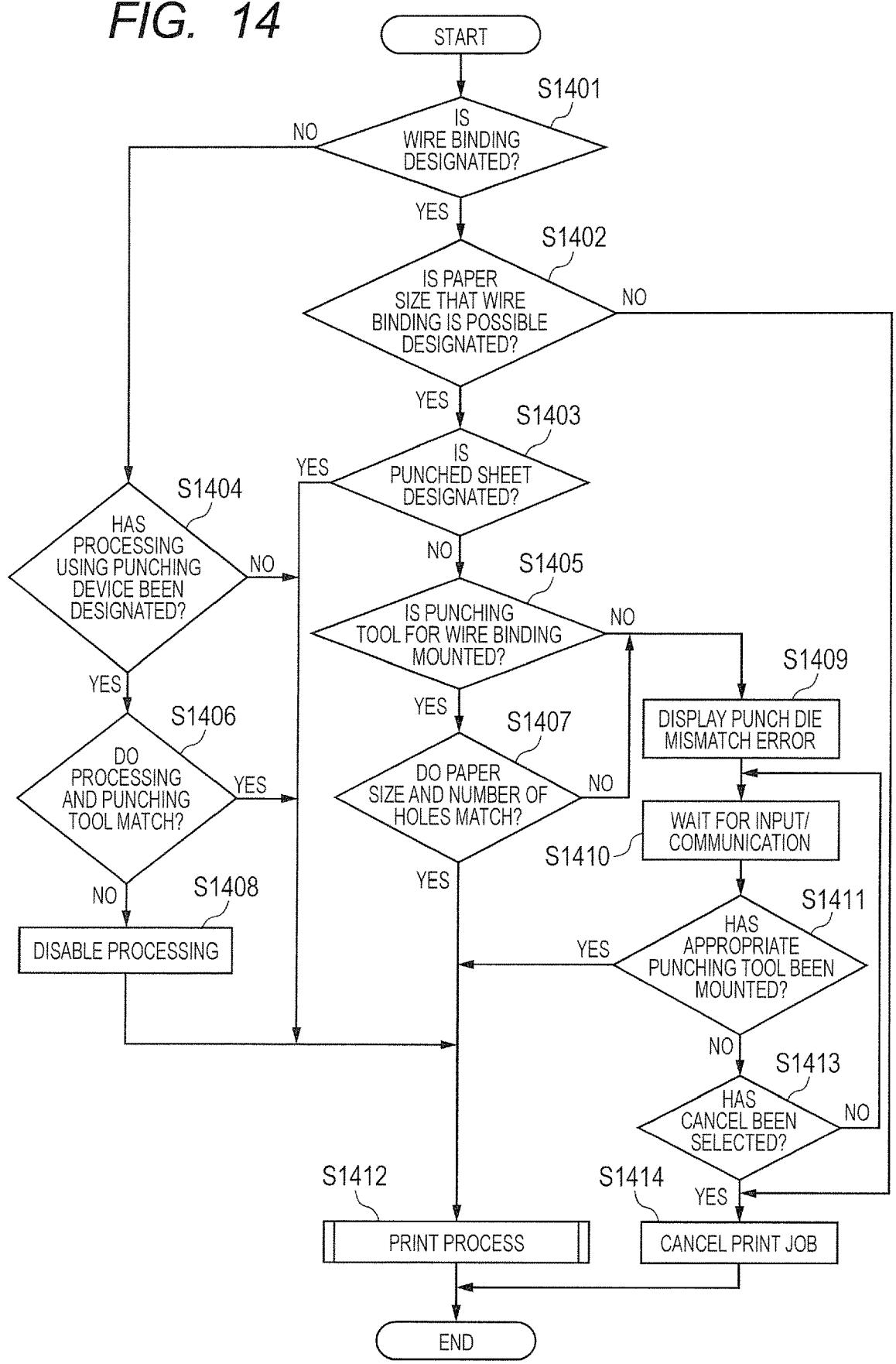
FIG. 14 is a flowchart for illustrating the control method for the image forming apparatus.

FIG. 14 is a flowchart for illustrating the control method for the image forming apparatus of the second embodiment. The example relates to a control procedure of the controller 205 conducted when the processing for the print job is started. The respective steps are achieved by the CPU included in the controller 205 executing the stored control programs. The same processing as that of the first embodiment is omitted from the description. Step S1401 is the same as Step S1201.

In Step S1402, the controller 205 refers to the setting of the print job stored in the HDD 209 to determine whether or not the paper size of the paper setting is the paper size that the wire binding is possible. In this case, when the controller 205 determines that the paper size is the paper size that the wire binding is possible, the controller 205 advances the processing to Step S1403. Meanwhile, when the controller 205 determines that the paper size is not the paper size that the wire binding is possible, the controller 205 advances the processing to Step S1414.

In Step S1403, the controller 205 refers to the setting of the print job stored in the RAM 208 to determine whether or not the paper type of the paper setting is the punched paper. In this case, when the controller 205 determines that the paper type is the punched paper, the controller 205 advances the processing to Step S1412. Meanwhile, when the controller 205 determines that the paper type is not the punched paper, the controller 205 advances the processing to Step S1405.

The processing of Step S1404 is the same as Step S1202 illustrated in FIG. 12, the processing of Step S1405 is the same as the processing of Step S1203 illustrated in FIG. 12, and the processing of Step S1406 is the same as the processing of Step S1205 illustrated in FIG. 12.

In Step S1407, the controller 205 compares the information on the type of the punching tool 501 or the information on the number of punches 502, which is stored in the RAM 208, with the paper size of the paper setting, and determines whether or not the number of holes to be punched by the punches 502 is appropriate for the paper size. In this case, when the controller 205 determines that the type of the punching tool 501 is appropriate for the paper size, the controller 205 advances the processing to Step S1412. Meanwhile, when the controller 205 determines that the type of the punching tool 501 is not appropriate for the paper size, the controller 205 advances the processing to Step S1409. The processing of Step S1408 is the same as the processing of Step S1207 illustrated in FIG. 12, and the processing of from Step S1409 to Step S1411 is the same as the processing of from Step S1204 to Step S1208 illustrated in FIG. 12.

In Step S1412, the controller 205 conducts the print process of the print job. The process is the same as a normal print process.

Meanwhile, the print job determined to have the wire binding designated in Step S1401 includes the binding step described with reference to FIG. 6A to FIG. 6D in the print process, but the print job determined to have the punched paper designated in Step S1403 does not include the punching step.

In Step S1412, when the print process is finished, the controller 205 removes the print job from the print job queue, and the controller 205 brings the flow at the start of the print job processing to an end. The processing of from Step S1413 and Step S1414 is the same as the processing of from Step S1210 to Step S1211 illustrated in FIG. 12.

In the second embodiment, it is determined based on the information on the type and the size of paper to be used whether or not the punching step is required and whether or not the number of holes to be punched by the punches 502 is appropriate. This enables the print process involving a wire bookbinding process and the punching process to be appropriately conducted on the paper having various types and sizes.

In the first and second embodiments described above, as illustrated in FIG. 11, the controller 205 of the MFP 101 determines during the setting using the bookbinding setting screen whether or not the bookbinding device 223 is mounted and whether or not the punching tool 501 appropriate for the wire binding is mounted.

However, in a case where the print job is submitted from the PC 102, the PC 102 may conduct the same control as the control conducted by the controller 205 when conducting the bookbinding setting. In this case, the PC 102 communicates to/from the controller 205 to obtain the information relating to whether or not the bookbinding device 223 is mounted and whether or not the punching tool 501 appropriate for the wire binding is mounted. Therefore, also in the case where the print job is input from the PC 102, it is possible to prevent the print job having the wire binding designated from being transmitted to the MFP 101 under the state under which the MFP 101 cannot conduct the wire binding.

According to the embodiments, it is possible to prevent the execution of the print job having the wire binding designated from being started under the state under which the wire binding cannot be conducted.

Other Embodiment

The present invention can also be applied to a configuration in which a data processing apparatus 103 functions as an external controller configured to receive the print job from a PC on the network.

Specifically, the data processing apparatus 103 is configured to obtain information on the punching device 222 and the bookbinding device 223 from the image forming apparatus, and to compare the information with contents of the received print job, to thereby execute the above-mentioned control. With this configuration, the same effects can be expected.

In addition, the same effects can be expected by providing the control method to be executed by the above-mentioned information processing apparatus as a program or a storage medium.

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-171884, filed Sep. 2, 2016, which is hereby incorporated by reference herein in its entirety.

What is claimed is:

1. An image forming apparatus, which discharges a sheet to a punching apparatus configured to perform a punching process on the sheet with use of a punch die, the punching apparatus discharging the sheet to a ring binding apparatus configured to perform a ring binding process for generating a ring bookbinding product having a binding member inserted through a hole punched in the sheet, a first punch die for the ring binding apparatus and a second punch die not for the ring binding apparatus being selectively mountable to the punching apparatus, the image forming apparatus comprising:
a display unit configured to display a print setting screen; and
at least one processor configured to perform the processing of:
receiving, from the punching apparatus, a signal indicative of a type of a die mounted in the punching apparatus,
determining whether or not the first punch die is mounted in the punching apparatus based on the signal indicative of the type of the die, and
controlling the display unit so that the ring binding process is not selected on the print setting screen in a case where the first punch die is not mounted in the punching apparatus and so that the ring binding process is selectable on the print setting screen in a case where the first punch die is mounted in the punching apparatus and the ring binding apparatus is connected.

2. An image forming apparatus according to claim 1, wherein the at least one processor compares specifications of a punch die mounted in the punching apparatus with specifications of the first punch die to determine whether or not the first punch die is mounted in the punching apparatus.

3. An image forming apparatus, which discharges a sheet to a punching apparatus configured to perform a punching process on the sheet, the punching apparatus discharging the sheet to a ring binding apparatus configured to perform a ring binding process for generating a ring bookbinding product having a binding member inserted through a hole punched in the sheet, a first punch die for the ring binding apparatus and a second punch die not for the ring binding apparatus being selectively mountable to the punching apparatus, the image forming apparatus comprising:

a receiver configured to receive a print job, which includes a designation for performing the ring binding process using the binding member; and at least one processor configured to perform the processing of:

receiving, from the punching apparatus, a signal indicative of a type of a die mounted in the punching apparatus, determining whether or not the first punch die is mounted in the punching apparatus based on the signal indicative of the type of the die, in a case where the print job received by the receiver is executed, and inhibiting an execution of the print job from being performed and awaiting receipt of an instruction to cancel the print job from a user in a case where the first punch die is not mounted in the punching apparatus, and then, if the instruction to cancel the print job is received, deleting the print job.

4. An image forming apparatus according to claim 3, further comprising a display unit configured to display information, wherein the at least one processor displays on the display unit a message prompting a user to mount the first punch die to the punching apparatus, and wherein when the first punch die is mounted in the punching apparatus after the message is displayed, the at least one processor allows the execution of the print job.

5. An image forming apparatus according to claim 3, wherein the print job is received through a network.

6. An image forming system, comprising:

an image forming apparatus configured to form an image on a sheet and discharge the sheet;

a punching apparatus configured to perform a punching process on the sheet discharged from the image forming apparatus with use of a punch die and discharge the sheet, a first punch die and a second punch die being selectively mounted to the punching apparatus;

a ring binding apparatus configured to perform a ring binding process for generating a ring bookbinding product having a binding member inserted through a hole punched in the sheet discharged from the punching apparatus, the first punch die comprising a punch die for the ring bookbinding apparatus and the second punch die comprising a punch die not for the ring bookbinding apparatus;

a display unit configured to display a print setting screen; and at least one processor configured to perform the processing of:

receiving, from the punching apparatus, a signal indicative of a type of a die mounted in the punching apparatus, determining whether or not the first punch die is mounted in the punching apparatus based on the signal indicative of the type of the die, and controlling the display unit so that the ring binding process is not selected on the print setting screen in a case where the first punch die is not mounted in the punching apparatus and so that the ring binding process is selectable on the print setting screen in a case where the first punch die is mounted in the punching apparatus and the ring binding apparatus is connected.

7. An image forming system, comprising:

an image forming apparatus configured to form an image on a sheet and discharge the sheet;

a punching apparatus configured to perform a punching process on the sheet discharged from the image forming apparatus with use of a punch die, a first punch die and a second punch die being selectively mounted to the punching apparatus;

a ring binding apparatus configured to perform a ring binding process for generating a ring bookbinding product having a binding member inserted through a hole punched in the sheet by the punching apparatus, the first punch die comprising a punch die for the ring bookbinding apparatus and the second punch die comprising a punch die not for the ring bookbinding apparatus;

a receiver configured to receive a print job, which includes a designation for performing the ring binding process using the binding member; and at least one processor configured to perform the processing of:

receiving, from the punching apparatus, a signal indicative of a type of a die mounted in the punching apparatus, determining whether or not the first punch die is mounted in the punching apparatus based on the signal indicative of the type of the die, in a case where the print job received by the receiver is executed, and inhibiting an execution of the print job from being performed and awaiting receipt of an instruction to cancel the print job from a user in a case where the first punch die is not mounted in the punching apparatus, and then, if the instruction to cancel the print job is received, deleting the print job.

8. An information processing apparatus, which is configured to transmit a print job to an image forming apparatus which discharges a sheet to a punching apparatus configured to perform a punching process on the sheet with use of a punch die, the punching apparatus discharging the sheet to a ring binding apparatus configured to perform a ring binding process for generating a ring bookbinding product having a binding member inserted through a hole punched in the sheet, a first punch die for the ring binding apparatus and a second punch die not for the ring binding apparatus being selectively mountable to the punching apparatus, the information processing apparatus comprising:

a transmitter configured to transmit the print job to the image forming apparatus; and at least one processor configured to perform the processing of:

receiving, from the punching apparatus, a signal indicative of a type of a die mounted in the punching apparatus, determining whether or not the first punch die is mounted in the punching apparatus based on the signal indicative of the type of the die, in a case where the print job to be transmitted by the transmitter includes a designation for performing the ring binding process, and inhibiting the transmitter from transmitting the print job to the image forming apparatus in a case where the print job includes the designation for performing the ring binding process and the first punch die is not mounted in the punching apparatus.

9. An information processing apparatus, which is configured to transmit a print job to an image forming apparatus which discharges a sheet to a punching apparatus configured to perform a punching process on the sheet with use of a punch die, the punching apparatus discharging the sheet to a ring binding apparatus configured to perform a ring binding process for generating a ring bookbinding product having a binding member inserted through a hole punched in the sheet, a first punch die for the ring binding apparatus and a second punch die not for the ring binding apparatus being selectively mountable to the punching apparatus, the information processing apparatus comprising:

a display unit configured to display a setting screen for the ring binding process as the print job; and at least one processor configured to perform the processing of:

receiving, from the punching apparatus, a signal indicative of a type of a die mounted in the punching apparatus, determining whether or not the first punch die is mounted in the punching apparatus based on the signal indicative of the type of the die, and controlling the display unit so that the ring binding process is not selected on the setting screen in a case where the first punch die is not mounted in the punching apparatus and so that the ring binding process is selectable on the print setting screen in a case where the first punch die is mounted in the punching apparatus and the ring binding apparatus is connected.

10. A control method for an information processing apparatus configured to transmit a print job to an image forming apparatus which discharges a sheet to a punching apparatus configured to perform a punching process on the sheet with use of a punch die, the punching apparatus discharging the sheet to a ring binding apparatus configured to perform a ring binding process for generating a ring bookbinding product having a binding member inserted through a hole punched in the sheet, a first punch die for the ring binding apparatus and a second punch die not for the ring binding apparatus being selectively mountable to the punching apparatus, the control method comprising:

receiving, from the punching apparatus, a signal indicative of a type of a die mounted in the punching apparatus, determining whether or not the first punch die is mounted in the punching apparatus based on the signal indicative of the type of the die; and controlling the information processing apparatus to inhibit the information processing apparatus from transmitting the print job to the image forming apparatus in a case where the print job includes a designation for performing the ring binding process and the first punch die is not mounted in the punching apparatus.

11. A non-transitory computer-readable storage medium, which stores a program which makes a computer execute a control method for an information processing apparatus configured to transmit a print job to an image forming apparatus which discharges a sheet to a punching apparatus configured to perform a punching process on the sheet with use of a punch die, the punching apparatus discharging the sheet to a ring binding apparatus configured to perform a ring binding process for generating a ring bookbinding product having a binding member inserted through a hole punched in the sheet, a first punch die for the ring binding apparatus and a second punch die not for the ring binding apparatus being selectively mountable to the punching apparatus, the control method comprising:

receiving, from the punching apparatus, a signal indicative of a type of a die mounted in the punching apparatus, determining whether or not the first punch die is mounted in the punching apparatus based on the signal indicative of the type of the die; and controlling the information processing apparatus to inhibit the information processing apparatus from transmitting the print job to the image forming apparatus in a case where the print job includes a designation for performing the ring binding process and the first punch die is not mounted in the punching apparatus.

12. A control method for an information processing apparatus configured to display a setting screen for a ring binding process on a display unit and transmit a print job to an image forming apparatus which discharges a sheet to a punching apparatus configured to perform a punching process on the sheet with use of a punch die, the punching apparatus discharging the sheet to a ring binding apparatus configured to perform the ring binding process for generating a ring bookbinding product having a binding member inserted through a hole punched in the sheet, a first punch die for the ring binding apparatus and a second punch die not for the ring binding apparatus being selectively mountable to the punching apparatus, the control method comprising:

receiving, from the punching apparatus, a signal indicative of a type of a die mounted in the punching apparatus, determining whether or not the first punch die is mounted in the punching apparatus based on the signal indicative of the type of the die; and controlling the display unit so that the ring binding process is not selected on the setting screen in a case where the first punch die is not mounted in the punching apparatus and so that the ring binding process is selectable on the print setting screen in a case where the first punch die is mounted in the punching apparatus and the ring binding apparatus is connected.

13. A non-transitory computer-readable storage medium, which stores a program which makes a computer execute a control method for an information processing apparatus configured to display a setting screen for a ring binding process on a display unit and transmit a print job to an image forming apparatus which discharges a sheet to a punching apparatus configured to perform a punching process on the sheet with use of a punch die, the punching apparatus discharging the sheet to a ring binding apparatus configured to perform a ring binding process for generating a ring bookbinding product having a binding member inserted through a hole punched in the sheet, a first punch die for the ring binding apparatus and a second punch die not for the ring binding apparatus being selectively mountable to the punching apparatus, the control method comprising:

receiving, from the punching apparatus, a signal indicative of a type of a die mounted in the punching apparatus, determining whether or not the first punch die is mounted in the punching apparatus based on the signal indicative of the type of the die; and controlling the display unit so that the ring binding process is not selected on the setting screen in a case where the first punch die is not mounted in the punching apparatus and so that the ring binding process is selectable on the print setting screen in a case where the first punch die is mounted in the punching apparatus and the ring binding apparatus is connected.

\* \* \* \* \*